United States Patent
Kano

(10) Patent No.: US 7,664,785 B2
(45) Date of Patent: Feb. 16, 2010

(54) METHOD AND APPARATUS OF WAFS BACKUP MANAGED IN CENTRALIZED CENTER

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 624 days.

(21) Appl. No.: 11/405,536

(22) Filed: Apr. 18, 2006

(65) Prior Publication Data

US 2007/0260717 A1    Nov. 8, 2007

(51) Int. Cl.
 G06F 17/30    (2006.01)
(52) U.S. Cl. .................... 707/200; 707/201; 707/202; 707/204
(58) Field of Classification Search ............... 707/102, 707/201, 202, 204
See application file for complete search history.

(56) References Cited

U.S. PATENT DOCUMENTS

| | | | | |
|---|---|---|---|---|
| 5,513,314 A | * | 4/1996 | Kandasamy et al. | 714/6 |
| 5,895,488 A | * | 4/1999 | Loechel | 711/135 |
| 6,389,420 B1 | * | 5/2002 | Vahalia et al. | 707/10 |
| 7,168,001 B2 | * | 1/2007 | Johnson et al. | 714/13 |
| 7,272,619 B1 | * | 9/2007 | Lanzatella et al. | 707/204 |
| 7,386,531 B2 | * | 6/2008 | Kiessig et al. | 707/1 |
| 2004/0111390 A1 | * | 6/2004 | Saito et al. | 707/1 |
| 2005/0187891 A1 | * | 8/2005 | Johnson et al. | 707/1 |
| 2005/0198247 A1 | * | 9/2005 | Perry et al. | 709/223 |
| 2006/0004765 A1 | * | 1/2006 | Anderson et al. | 707/10 |
| 2007/0162462 A1 | * | 7/2007 | Zhang et al. | 707/10 |
| 2007/0226320 A1 | * | 9/2007 | Hager et al. | 709/219 |
| 2008/0126857 A1 | * | 5/2008 | Basham et al. | 714/25 |

* cited by examiner

*Primary Examiner*—Charles Rones
*Assistant Examiner*—Rezwanul Mahmood
(74) *Attorney, Agent, or Firm*—Mattingly & Malur, P.C.

(57) ABSTRACT

A system including a plurality of servers each executing an application, a plurality of Wide Area File System (WAFS) clients which are correspondingly connected to the servers, a WAFS server which is connected to each WAFS client, a storage system or network attached storage (NAS), connected to the WAFS server, which stores data in a plurality of volumes or filesystem forming a consistency group, and a backup server for controlling backup of the consistency group. Each WAFS client includes a cache for temporarily storing data, and a cache manager for managing the cache. The WAFS server includes a backup agent that responds to the backup server, and a consistency manager that maintains consistency among the caches. The system is implemented to bring to a state of consistency the caches in the WAFS clients and the corresponding volumes in the WAFS server.

36 Claims, 17 Drawing Sheets

Export Table

| Name on WAFS server | Storage | | Allowed hosts | | ... |
|---|---|---|---|---|---|
| | WWN | LUN | IP | Port | |
| /dev/c1t1d1 | 50000e1000002500 | 1 | 10.1.1.1 | 1023 | ... |
| /dev/c1t1d3 | 50000e1000002500 | 3 | 10.1.1.2 | 1023 | ... |
| /dev/c1t1d5 | 50000e1000002500 | 5 | 10.1.1.3 | 1023 | ... |
| ... | ... | | ... | | ... |

FIG. 3

Read Procedure (Sync/Async)

Client Tables

| IP | Mode | Result for becoming asynchronous | Result for becoming synchronous | ... |
|---|---|---|---|---|
| 10.1.1.1 | Synchronous | Success | - | ... |
| 10.1.1.2 | Asynchronous | - | - | ... |
| 10.1.1.3 | In-Flush | In-process | - | |
| ... | ... | ... | ... | ... |

FIG.9

Export Table

| Name on WAFS server | Allowed Host IP | Target Port | ... |
|---|---|---|---|
| /mnt/wafs1 | 10.1.1.1 | 2050 | ... |
| /mnt/wafs2 | 10.1.1.2 | 2050 | ... |
| /mnt/wafs3 | 10.1.1.3 | 2050 | |
| ... | ... | ... | ... |

FIG.12

Export Table (a) Synchronous (b) Asynchronous

US 7,664,785 B2

METHOD AND APPARATUS OF WAFS BACKUP MANAGED IN CENTRALIZED CENTER

BACKGROUND OF THE INVENTION

The present invention relates generally to a backup system for a volume or files in a Wide Area File System (WAFS). More particularly, the present invention relates to a backup system for a volume or files in a WAFS system when a cache is provided in a WAFS client of the WAFS system.

In today's environment the challenge of managing, for example, distributed enterprise efforts across multiple remote locations exists. While gigabytes of data can easily be shared on a local area network (LAN) using standard file server technology, these benefits do not extend to remote offices connected over a wide area network (WAN). When it comes to file sharing over WANs, standard file server protocols provide unacceptably slow response times when opening and writing files.

Various solutions have been proposed to solve the WAN file sharing problem including replicating file copies or implementing distributed file systems. Neither of these approaches provides a complete solution. Content delivery networks attempted to mitigate this problem by caching copies of files at each remote office. However, content delivery networks only provide a read-only copy of data at the remote offices.

WAFS systems combine distributed file systems with caching to allow real-time, read-write access to shared file storage from any location, while also providing interoperability with standard file sharing protocols such as the Network File System (NFS) and the Common Internet File System (CIFS) protocols. A WAFS system makes it possible to access a remote data center as though it were local. Such a system provides various benefits including enabling businesses, academic institutions, and government agencies having numerous branch offices to centrally manage data backups in real time.

In order to hide latency of file access from a client a cache server which is a WAFS client is used. Such a cache server is embodied in the iShared™ Server product marketed by TacitNetworks. Important properties of such a server are to maintain data coherency and consistency across the entire network. Although the TacitNetworks product provides a backup solution as described at Internet address: www.tacitnetworks.com/M03_01_03-Business-Continuity-Backup.php, there is no disclosure of how to backup data for a files of a WAFS server.

Prior cache based file systems in a WAN are disclosed, for example, by U.S. Patent Application Publication No. 2003/0163568 entitled "Storage System Management Data Through a Wide Area Network", by Y. Kano, et al. In this application there is described a system and method of how to access a file from a client on LAN via WAN. However, this Patent Application Publication does not disclose how to make a complete procedure for making a backup from a centralized server on a remote data center.

SUMMARY OF THE INVENTION

The present invention provides a system and method for the backup of a volume in a WAFS system when a cache is provided in the WAFS client of the WAFS system.

According to the present invention the system and method are implemented in a manner to bring to a state of consistency the volume in the WAFS client and the corresponding volumes or filesystem in the WAFS server which is managed by a data center side of the WAFS system. Thus, the system and method of the present invention implements the following procedure:

Sequence 1: A backup server connected to the WAFS server requests a backup agent included in the WAFS server to make a backup of a consistency group which has several volume pairs including primary and secondary volumes in a storage subsystem or a snapshot of files including primary file system and snapshot file system on a Network Attached Storage (NAS);

Sequence 2: The backup agent in the WAFS server requests that the consistency manager in the WAFS server brings to a state of consistency data among the WAFS clients and that the mode of access of the WAFS server by the WAFS client be changed from the asynchronous mode to the synchronous mode;

Sequence 3: The consistency manager in the WAFS server requests a cache manager in the WAFS client to flush all dirty data out of the cache and to change the mode of access by the WAFS client from the asynchronous mode to the synchronous mode;

Sequence 4: The cache manager in WAFS client flushes all dirty data out of the cache to the WAFS server. After flushing all dirty data out of the cache, the cache manager changes the mode of access of the WAFS server by the WAFS client from the asynchronous mode to synchronous mode;

Sequence 5: The storage subsystem or NAS makes a snapshot for the consistency group in response to a request from the backup agent; and Sequence 6: The consistency manager in WAFS server, in response to a request from the backup agent, requests the cache manager in WAFS client to change the mode of access from the synchronous mode to the asynchronous mode to enable the cache in WAFS client to operate.

The present invention also provides a system and method for backup of files on NAS in a WAFS system when a cache is provided in the WAFS client of the WAFS system. The sequence in case of files on NAS can use one of the sequences to bring to a state of consistency the volume in the WAFS client and the corresponding volumes in the WAFS server.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 3 illustrates an example of a list of entries of volumes in the WAFS server 30 exported to the WAFS client module 22 in WAFS client 20 according to an embodiment of the present invention;

FIG. 9 illustrates an example of a client table providing a list of entries indicating the state of the clients including success or failure of asynchronous or synchronous modes according to an embodiment of the present invention;

FIG. 12 illustrates an example of a list of entries of directories in the WAFS server 30 exported to the WAFS client module 22 in WAFS client 20 according to an embodiment of the present invention;

DETAILED DESCRIPTION OF THE INVENTION

The present invention as will be described in greater detail below provides an apparatus, method and system, particularly, for example, a method and a backup system for a volume in a WAFS system when a cache is provided in a WAFS client of the WAFS. The present invention provides various embodiments as described below. However it should be noted that the present invention is not limited to the embodiments described herein, but could extend to other embodiments as would be known or as would become known to those skilled in the art.

Figure 1:
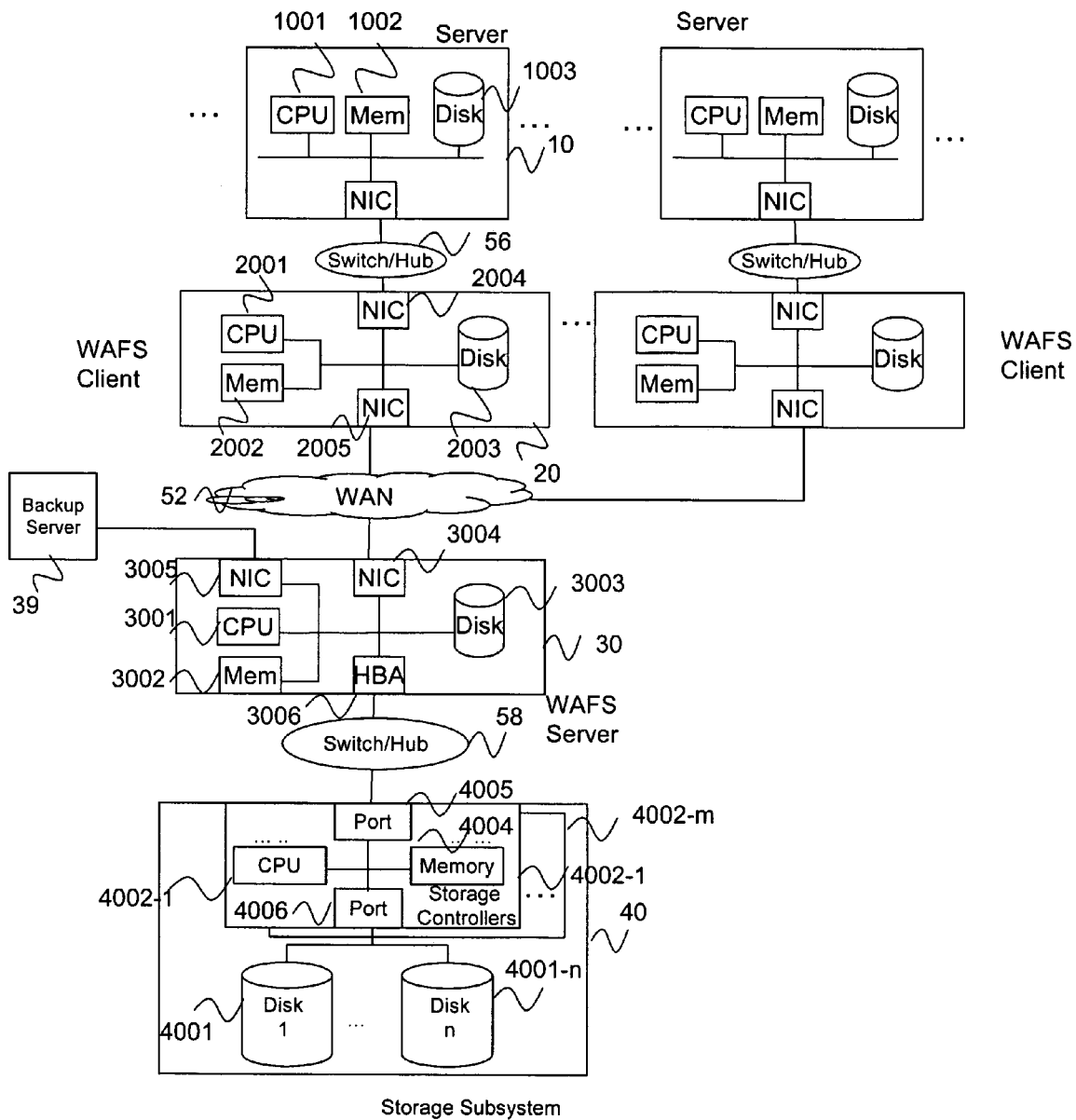
FIG. 1 illustrates a physical configuration of a $1^{st}$ practical example of a WAFS system according to an embodiment of the present invention.
Figure 2:
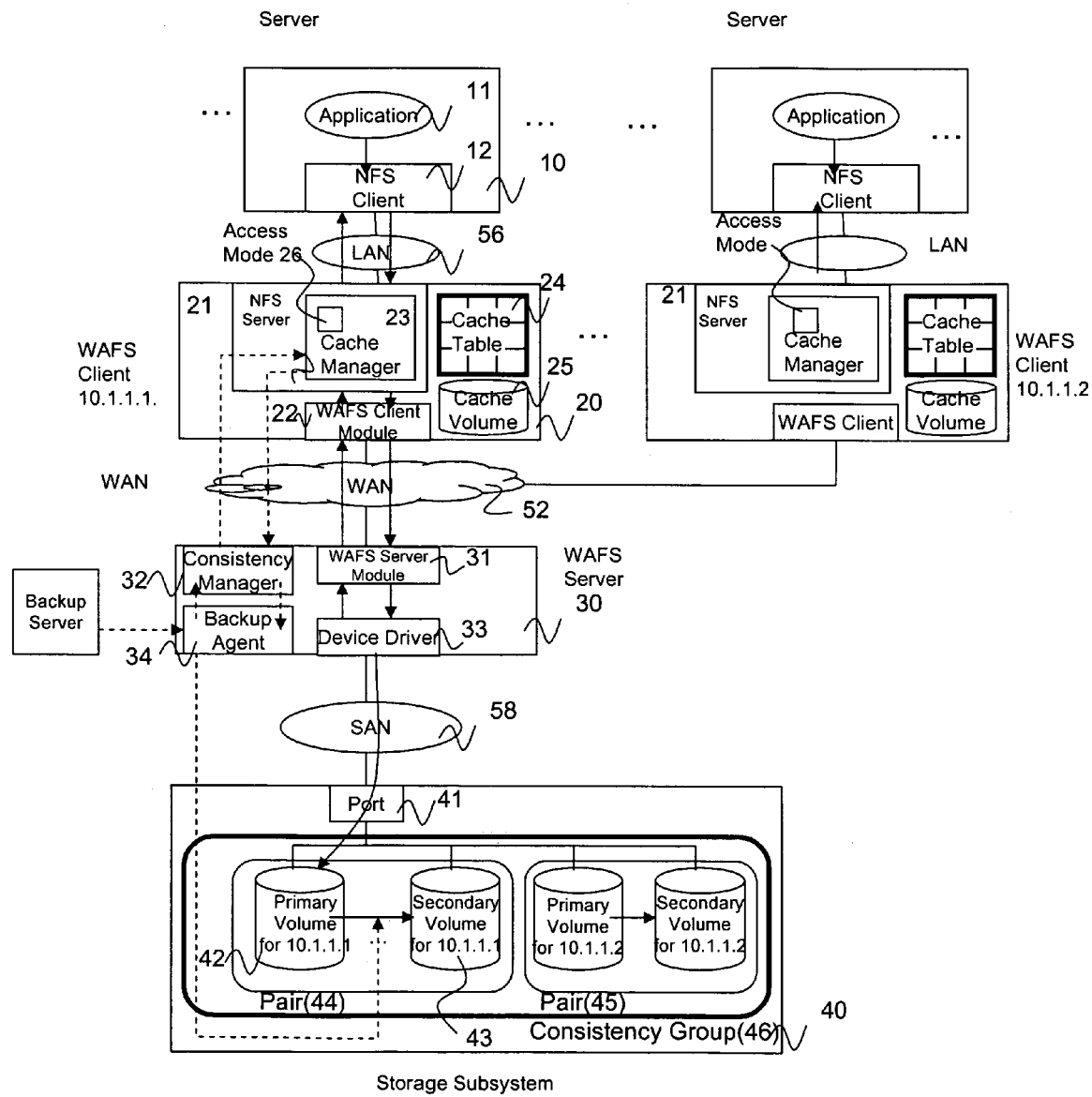
FIG. 2 illustrates an example of a logical configuration of the WAFS system illustrated in FIG. 1 according to an embodiment of the present invention.
Figure 10:
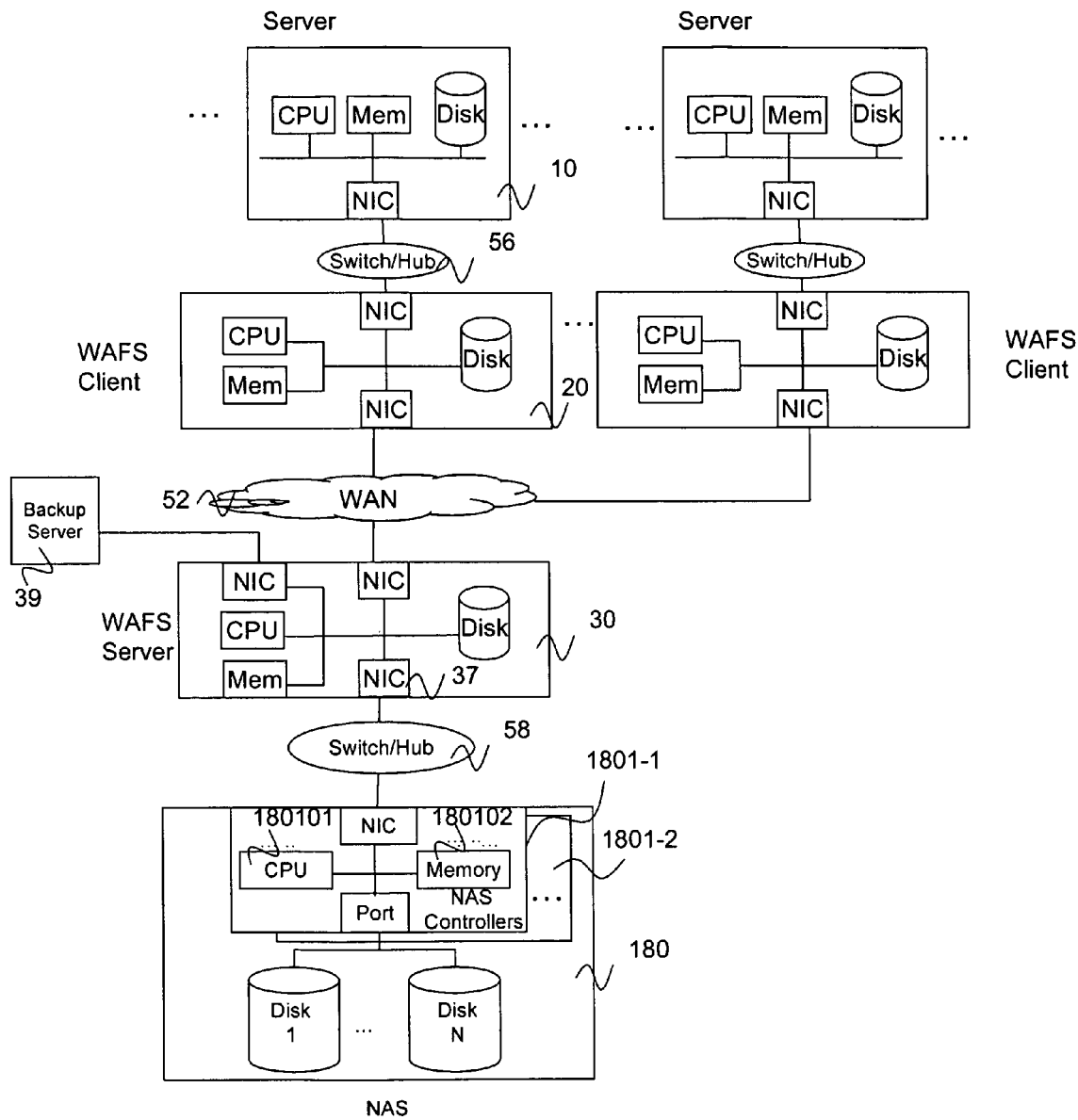
FIG. 10 illustrates a physical configuration of a $2^{nd}$ practical example of a WAFS system similar to the $1^{st}$ practical example of a WAFS system illustrated in FIG. 1 but including a Network Attached Storage (NAS) 180 rather than the storage subsystem 40 according to an embodiment of the present invention.
Figure 11:
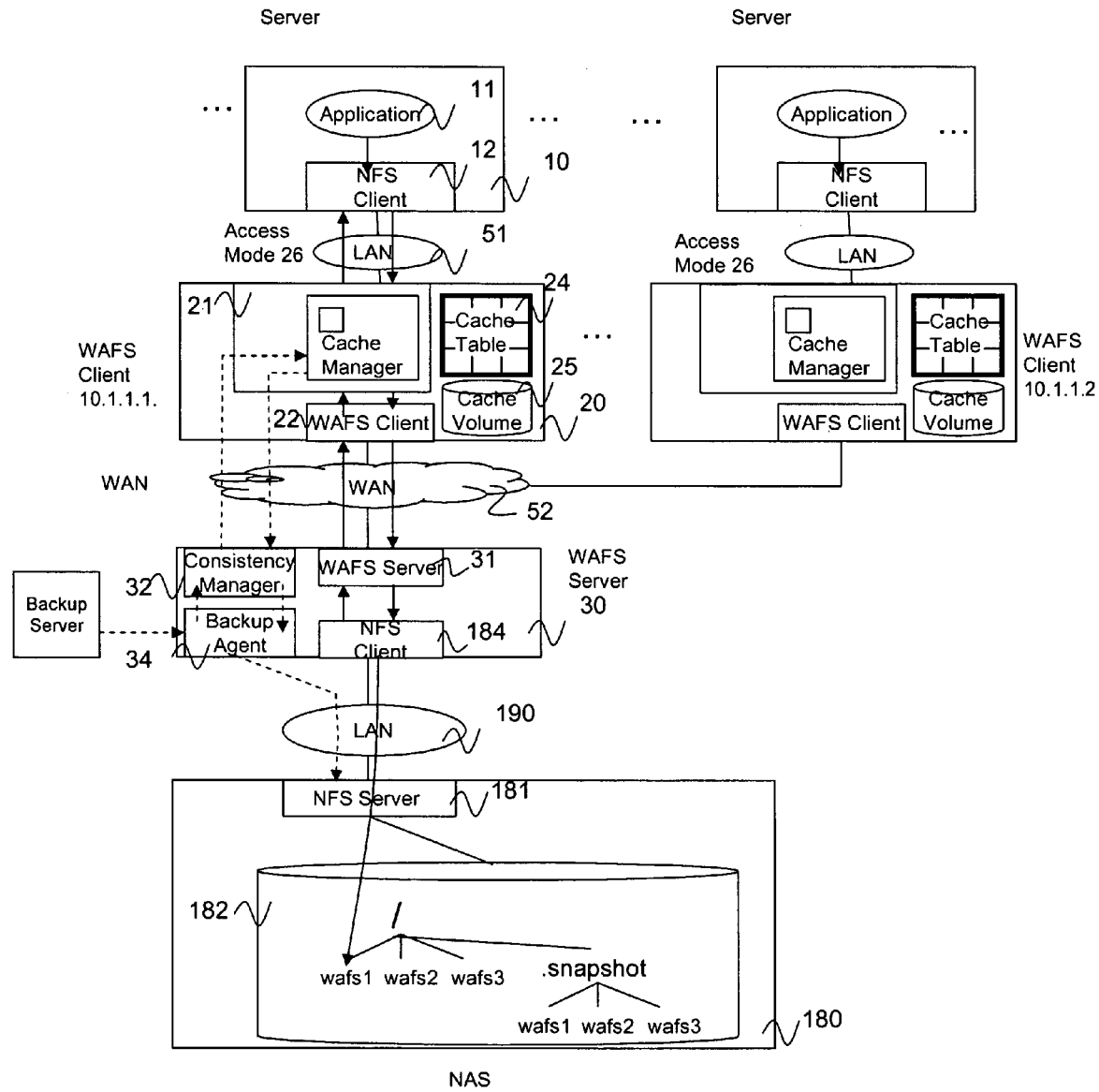
FIG. 11 illustrates an example of a logical configuration of the WAFS system illustrated in FIG. 10 according to an embodiment of the present invention.

The present invention provides two practical examples to backup cached data on a WAFS client initiated from a WAFS server on remote. The first ($1^{st}$) practical example is illustrated in FIGS. 1 and 2, whereas the second ($2^{nd}$) practical example is illustrated in FIGS. 10 and 11. Benefits common to both of the $1^{st}$ and $2^{nd}$ practical examples is that the system enables the making of a backup as initiated from a remote data center.

$1^{st}$ PRACTICAL EXAMPLE

The following is a description of the $1^{st}$ practical example when a Storage Area Network (SAN) 58 including a storage system 40 is used in combination with the WAFS system.

1. Physical Configuration

FIG. 1 illustrates an example of a physical configuration of the $1^{st}$ practical example of the present invention. As illustrated the system includes at least a server 10, at least a WAFS client 20, at least a WAFS server 30 and at least a storage system 40. A plurality of servers 10 and a plurality of WAFS clients 20 can be provided. Each server 10 is connected to a WAFS client 20 by a switch/hub or Local Area Network (LAN) 56 allowing for point-to-point or network type communications. Each WAFS client 20 is connected to the WAFS server 30 by a Wide Area Network (WAN) 52 and the WAFS server 30 is connected to the storage subsystem 40 by a switch/hub or Storage Area Network (SAN) 58 which allows for point-to-point or network type communications.

The server 10 is a general purpose server implemented by software such as Windows® based PC server or Unix® server executed by a computer. The server 10 includes a Central Processing Unit (CPU) 1001, memory 1002, disk 1003 and Network Interface Card (NIC) 1004 to connect with the switch/hub or LAN 56. The memory 1002, for example, stores a program executed by the CPU 1001 to perform the operations of the server 10.

The WAFS client 20 is a cache client in the WAFS system. The WAFS client 20 includes a CPU 2001, memory 2002, disk 2003 and a NIC 2004 to connect with the switch/hub or LAN 56 and a NIC 2005 to connect with the WAN 52. The memory 2002, for example, stores a program executed by the CPU 2001 to perform the operations of the WAFS client 20.

The WAFS server 30 is a server in the WAFS system. The WAFS server 30 includes a CPU 3001, memory 3002, disk 3003, a NIC 3004 to connect with the WAN 52, a NIC 3005 to connect with a backup server 39 which initiates backup operations according to preset conditions or based on instructions by the system administrator, and a host bus adapter (HBA) 3006 to connect with the switch/hub or SAN 58. The memory 3002, for example, stores a program executed by the CPU 3001 to perform the operations of the WAFS server 30.

The Storage subsystem 40 is a redundant array of inexpensive disks (RAID) technology based storage system. The storage system 40 includes disks 4001-1 through 4001-$n$ and storage controllers 4002-1 through 4002-$m$. Each storage controller 4002 includes a CPU 4003, memory 4004, a port 4005 to connect to the switch/hub or SAN 58 and a port 4006 to connect to disks 4001-1 through 4001-$n$. The memory 4004, for example, stores a program executed by the CPU 4003 to perform the operations of the storage controller 4002.

As per the above the server 10 and WAFS client 20 can be connected to each other by the switch/hub or LAN 56. The switch/hub can be an Ethernet Switch or Hub and the LAN can be implemented by various technologies including infiniBand, Token Ring, FDDI, wireless LAN like IEEE 802.11a/b/g, etc.

Also, as per the above the WAFS server 30 and the storage subsystem 40 can be connected to each other by the switch/hub or SAN 58. The switch/hub can be an Ethernet Switch or Hub, Fibre Channel Switch in case of FC-small computer system interface (SCSI) protocol, etc. and the SAN can be implemented by various technologies including infiniBand, Token Ring, FDDI, wireless LAN like IEEE 802.11a/b/g, Fibre Channel, etc.

Further, as per the above, the WAFS client 20 and WAFS server 30 can be connected to each other by the WAN 52. The WAN, can be implement by a T1 line, an Asynchronous Transfer Mode (ATM) system, a Digital Subscriber Line (DSL), etc. In order to connect to the WAN 52, the WAFS client 20 and WAFS server 30 can use a bridge between a Ethernet as implemented on a LAN and a T1 line, ATM system, or DSL. When a DSL is used, a DSL modem is required.

2. Logical Configuration

FIG. 2 illustrates a logical configuration according to the $1^{st}$ practical example of the present invention as implemented on the physical configuration shown in FIG. 1. As per the present invention the server 10 can run a general operating system such as Windows®, Linux and Unix®, which allow an application 11 such as Word®, Excel®, PowerPoint® or Oracle® DB to run on the top. The server 10 uses a Network File System (NFS) client 12 to access a file based on the execution of instructions of the application 11. The NFS client 12 can specify a server to which an access request is directed using a unique identifier, such as, an Internet Protocol (IP) address and can specify the requested service using a unique port number. The switch/hub or LAN 56 is accessible using Transmission Control Protocol/Internet Protocol (TCP/IP), Token Ring, Fibre Distributed Data Interface (FDDI), etc.

The description of the present invention uses terms such as "export directory" and "mount directory" as terms of general NFS operation. Also, the description of the present invention uses terms such as "exports volume" and "mount volume". The volume is provided from the WAFS server 30 to the WAFS client 20, for example, by use of the iSCSI protocol. The behavior of a mount volume is that the WAFS client 20 attaches a volume on the device driver. Also, the behavior of an export volume is that the WAFS server allows the WAFS client 20 to access the volume which the storage provides.

The WAFS client 20 includes a NFS server 21, cache manager 23 and WAFS client module 22. The NFS server 21 exports a directory which is provided from WAFS client 20 to the server 10. Alternatively, a Common Internet File System (CIFS) server, Web-based Distributed Authoring and Versioning (WebDAV), or some other kind of file sharing protocol can be used instead of the NFS server 21. The cache manager 23 manages cache data of the NFS server 21 as will be described in more detail below.

The WAFS client 20 mounts a volume exported from the WAFS server 30, and by specifying an IP address, exports the directory to the server 10. The WAN 52 enables communication data between remote and local sites. As per the above the WAN 52 can for example work by Ethernet, TCP/IP, ATM system, T1 line, and T10. Added security to control access between the WAFS server 30 and the WAN 52 and between the WAFS client 20 and the WAN 52 can be provided by a gateway, firewall, proxy server, etc.

The WAFS server 30 includes WAFS server module 31, device driver 33, consistency manager 32, and backup agent 34. The WAFS server module 31 exports the volume to the WAFS client 20, for example, by use of the iSCSI protocol. There are several export methods that can be used other than iSCSI such as SCSI, FC-SCSI, NFS/CIFS and special protocols which are based on NFS but tries to read ahead of the NFS access pattern based on application behavior.

According to the present $1^{st}$ practical example, FC-SCSI is used to communicate between the WAFS server 30 and the storage system 40. The device driver 33 in the WAFS Server 30, can for example, access volume 42, as a primary volume, in the storage system 40 via port 41 by specifying a World Wide Name (WWN) of the port 41 and a Logical Unit Number (LUN) of the volume 42.

The Storage system 40 includes the primary volume 42, a secondary volume 43 and the port 41. The primary volume 42 is accessed as the user volume of the WAFS server 30 by using block access protocols such as SCSI, FC-SCSI, iSCSI, etc. The storage system 40 provides a Point-In-Time (PIT) copy capability so as to make a PIT image of each volume by copying the contents of the volume into another volume at a particular point in time. An example of PIT technology is Hitachi Lighting 9900V series' Shadowlmange®, True-Copy® using PIT capability or Thunder 9500V's Quick-Shadow® which provides differential snapshots using PIT technology.

The SAN 58 can, for example, use a block access protocol such as iSCSI, SCSI, SCSI-2/3, Advanced Technology Attachment/Integrated Drive Electronics (ATA/IDE), Serial Attached SCSI (SAS), etc. to implement communications between the WAFS server 30 and the storage system 40

3. Initial Setup & Access from WAFS Client

Before explaining the details of procedures according to the $1^{st}$ practical example of the present invention of performing a backup of a volume in a WAFS system when a cache is provided in the WAFS client, description is provided of the initial setup of the WAFS system.

Figure 15:
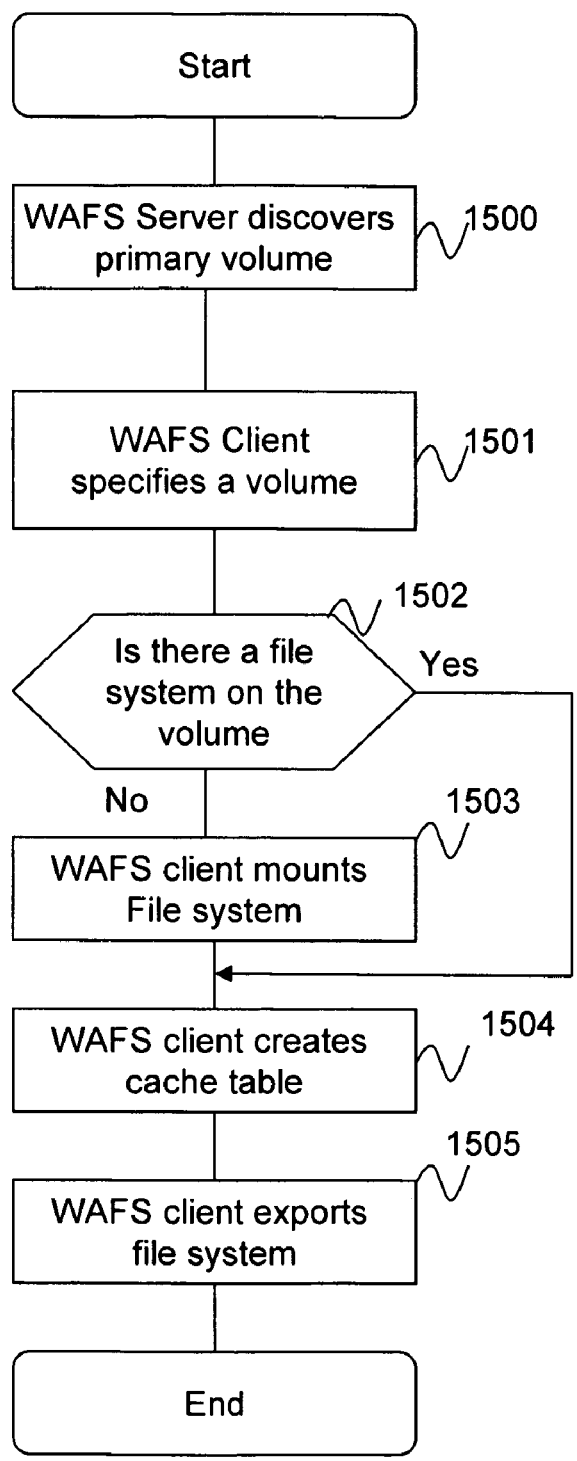
FIG. 15 illustrates the steps of the initial setup of the $1^{st}$ practical example of the WAFS system according to an embodiment of the present invention.

FIG. 15 illustrates the steps of the initial setup. As per FIG. 15 the WAFS server 30 performs a polling type procedure and discovers the primary volume 42 as identified by a WWN and LUN using the FC-SCSI protocol (Step 1500). As is known according to the iSCSI protocol, an IP address, port number and LUN can be used. The WAFS Server 30 exports the primary volume 42 to the WAFS client 20.

The WAFS server 31 module has a list 520 as per FIG. 3 of entries of volumes in the WAFS server 30 exported to the WAFS client module 22 in WAFS client 20. The list 520 as illustrated in FIG. 3 includes a plurality of entries with each entry including a device name 521 on which the exported volume is stored, a World Wide Name (WWN) 522 that specifies the port of the storage subsystem 40 through which access to the volume can be gained, a logical unit number 523 of the volume, an Internet Protocol (IP) address 524 of the host which is allowed to have access to the volume, and a port number 525 to which the host is connected and can gain access to the volume. If an authentication procedure is required between the WAFS client module 22 and the WAFS server module 31, then the list 520 can be expanded to include an identification (ID) and password for each entry that are used to implement the authentication procedure.

Each WAFS client 20 specifies a volume using an IP address and port number to mount the volume on WAFS client 20 (Step 1501). If an authentication procedure between the WAFS client 20 and the WAFS server 30 is required, then an ID and password is used by the WAFS client 20 to authenticate to the volume mounted on the WAFS server 30. If there is no preset file system such as UFS (UNIX File system http://www.isu.edu/departments/comcom/unix/workshop/ fstour.html), ext2(Second Extended Filesystem http:// e2fsprogs.sourceforge.net/ext2.html), XFS® (http://www.s-gi.com/products/software/xfs/), and NTFS® on the volume for access of the data stored therein; then the WAFS client 20 makes a file system for access of the data stored on the volume in accordance with a file system approved by the administrator of the WAFS client 20 (Step 1502). If not the process proceeds to Step 1504.

The WAFS client 20 mounts the file system from the volume by synchronous data access (Step 1503), the WAFS client 20 creates a cache table 24 for the mounted file system (Step 1504), and the WAFS client 20 exports a directory on file system to the NFS client 12 (Step 1505). The WAFS client 20 provides system calls to access the mounted directory. Each system call is in compliance with the Portable Operating System for Unix (POSIX) specification for accessing an Application Program Interface (API).

Thus, the NFS server 21 of the WAFS client 20 accesses an API to access a file as it is stored on the volume.

4. Access from WAFS Client to Server Considering Cache

The following will describe the operations performed in the 1$^{st}$ practical example of the WAFS system, particularly the WAFS client 20 when a cache is included.

According to the present invention the application 11 sends several system commands to the NFS client 12. The NFS client 12 translates each system command to the protocol used by the NFS server 21. Thus, there are, for example, at least two basic operations performed by the NFS client 12. The first operation is to implement read related operations such as "lookup", "read", and "getattr". The second operation is to implement write related operations such as "create", "write", and "setattr".

The cache manager 23 responds differently to the above described first and second operations since each has different characteristics relative to the other. The cache of course temporarily stores data and the cache manager 23 manages the operations of the cache. The cache in the present invention is provided by cache volume 25. Although there are several cache algorithms which can be implemented by the cache manager 23, the present invention makes use of a First-In-First-Out (FIFO) algorithm to manage entries in the cache. However, it should be noted that the present invention is not limited to using the FIFO algorithm. Other algorithms can be used.

In order to manage a cache using the FIFO algorithm, the cache manager 23 has a pointer to indicate an end of the latest entry of a cache table 24 corresponding to the earliest data stored in the cache, said pointer being incremented by one after each entry. The details of the cache table 24 will be described below. If the pointer reaches the end of the cache table 24, then the pointer is reset to indicate the first entry of the cache table 24. The pointer is primarily used in write related operations as will be discuss below. Of course, other types of algorithms like Least Recently Used (LRU), random, etc can be used.

Figure 4:
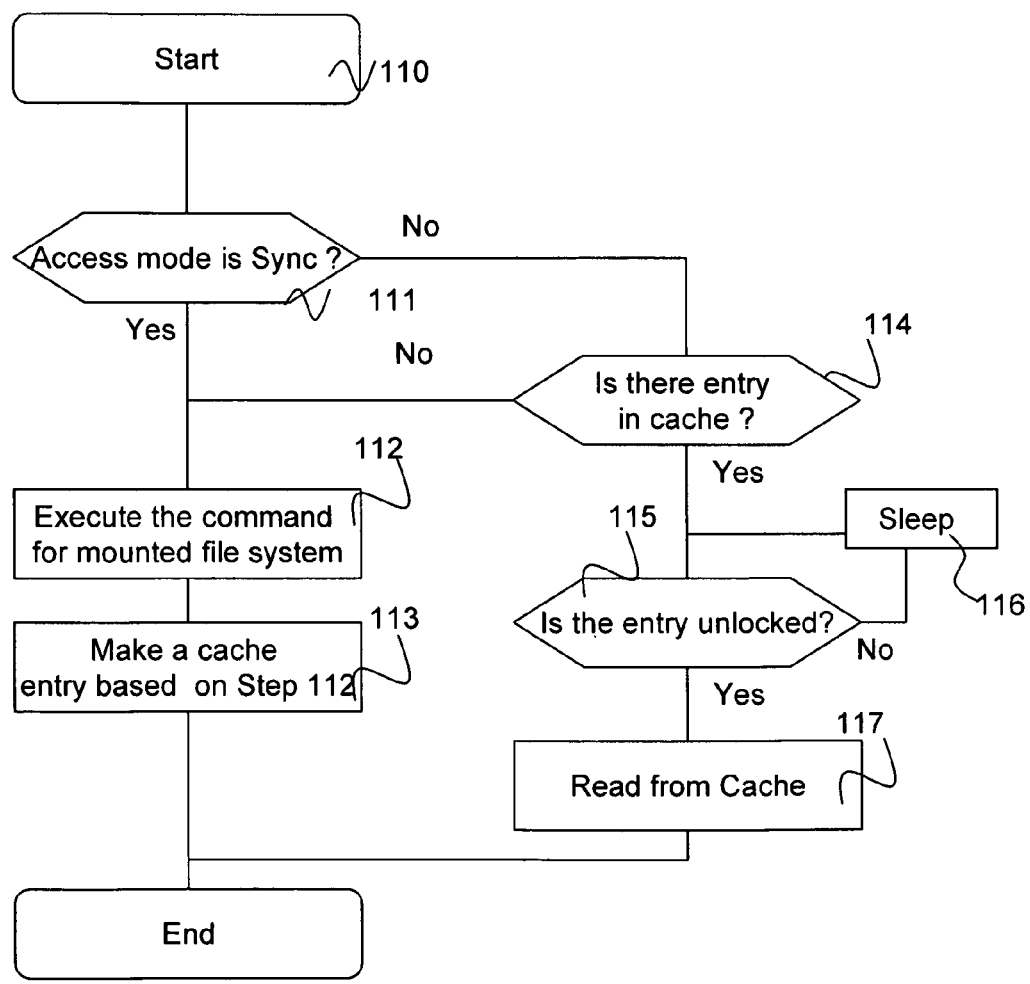
FIG. 4 is a flowchart of the steps performed to execute read related operations like "lookup", "read", "getattr" in the WAFS client 20 and the WAFS server 30.

The details of the operations to implement read related operations such as "lookup", "read", "getattr" are described below and are illustrated in FIG. 4.

According to the present invention as illustrated in FIG. 4, the NFS server 21 starts its operations upon receipt of read related operations such as "lookup" "read" "getattr" from the NFS client 12 on server 10 (Step 110). The cache manager 23 checks an indication of access mode 26 of the cache 25 in the WAFS client 20. The cache manager 23 maintains a value to indicate a current access mode of the cache, namely whether the access mode of the cache 25 is synchronous, asynchronous, or in-flushing (Step 111). If the access mode is synchronous, then the procedure goes to Step 112. If access mode is something other than synchronous, then the procedure goes to Step 114.

If the access mode is synchronous, then the cache manager 23 executes the operation corresponding to the issued command on the mounted file system which is provided to the WAFS server module 31 synchronously (Step 112). For example, a "lookup" operation uses an open system call on the file system and creates a 32 Byte (NFS v2) or 64 Byte (NFS v3) file handle for the file if the opening of the file is successful. Further, for example, a "read" operation uses a read system call to read data from the volume and a "getattr" operation gets an attribute corresponding to the file handle.

After Step 112, the cache manager 23 makes a cache entry based on the operations performed by Step 112 (Step 113). The cache entry is an input from the NFS server 21 to the cache table 24 as a result of performing the operations of Step 112. For example, when a lookup operation is performed, the WAFS client 20 has a file handle that is created by the NFS server 21, and a file name, and directory name that are inputs from NFS client 12. Those items are stored in cache table 24 as illustrated in FIG. 5.

Figure 5:
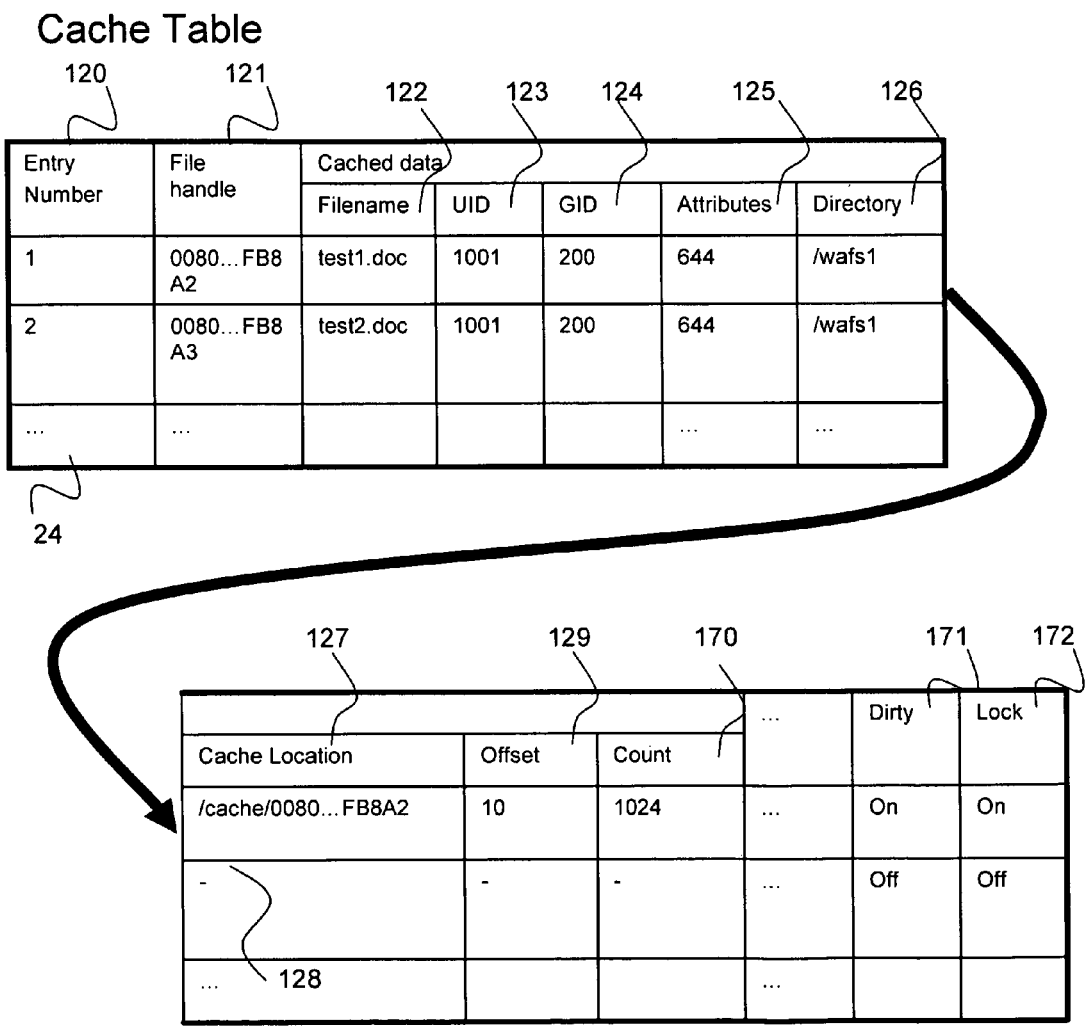
FIG. 5 illustrates an example of a cache table 24 provided in the WAFS client.

The cache table 24 as illustrated in FIG. 5 includes a plurality of entries each having an entry number 120 which is a fixed value for each entry of the cache table 24 to uniquely identify the entry, a file handle 121 which identifies the file in the file system, information regarding the cached data including a file name 122, an User ID (UID) 123, a Group ID (GID) 124, attributes 125, a directory 126 on the mounted file system, a cache data location 127, an offset 129 and a count 170 for the file, a cache dirty bit 171 indicating by being "on" or "off" whether the corresponding data is dirty or not, and a lock for the entry 172 for preventing changes to the entry when the lock is set to be "on" and not preventing such changes when the lock is set to "off".

The cache dirty bit 171 and lock 172 as used according to the present invention will be discussed in more detail later. However, as a brief matter it should be noted that the file handle 121, filename 122 and directory 126 can not be operated on when the lock 172 is set to be "on". Further, if the WAFS client 20 can not obtain some items like cache location 127, offset 129 and count 170 after an input or output operation, then the item will be left blank in the cache table 24 and such will be represented by the symbol "-" 128.

If the access mode is other than synchronous as per Step 111, then the cache manager 23 checks the existence of an entry specified on file handle (Step 114). If such an entry exists, then the procedure goes to Step 115. If an entry does not exist, then the procedure goes to Step 112.

When such an entry does exist, then the entry is checked whether it is locked (Step 115). If the entry is unlocked, then the procedure goes to Step 117. If the entry is locked meaning the corresponding data is being modified or the data is to be flushed out, then the procedure goes to Step 116. In Step 116 the procedure goes to sleep for a period of time, for example several mili-seconds (ms) before performing Step 115 again. In Step 117 the cache manager 23 reads the data based on the entry in cache table 24 or the data specified on cache data location 127.

As a reference, the following Table 1 includes a plurality of entries with each entry including items the WAFS server can obtain based on a NFS operation.

TABLE 1

| Operation | Items (R is from return on an operation, I is from inputs on an operation) |
|---|---|
| Lookup | File handle (R), file name (I), directory name (I) |
| GetAttr | File handle (R), attributes structure (Mode, Permission, UID, GID, etc . . .) (R) |
| Read | File handle (R), attributes (R), data (R), offset for data (I), count for count (I) |
| . . . | . . . |

Thus, as per the above Table 1, in case of read operation, the WAFS client 20 needs to store data on a cache volume 25. To store the data, WAFS client 20 creates a file which is named using a file handle in the cache directory on the WAFS client 20, said file handle being predefined by the file system and stores the data in the named file.

Figure 6:
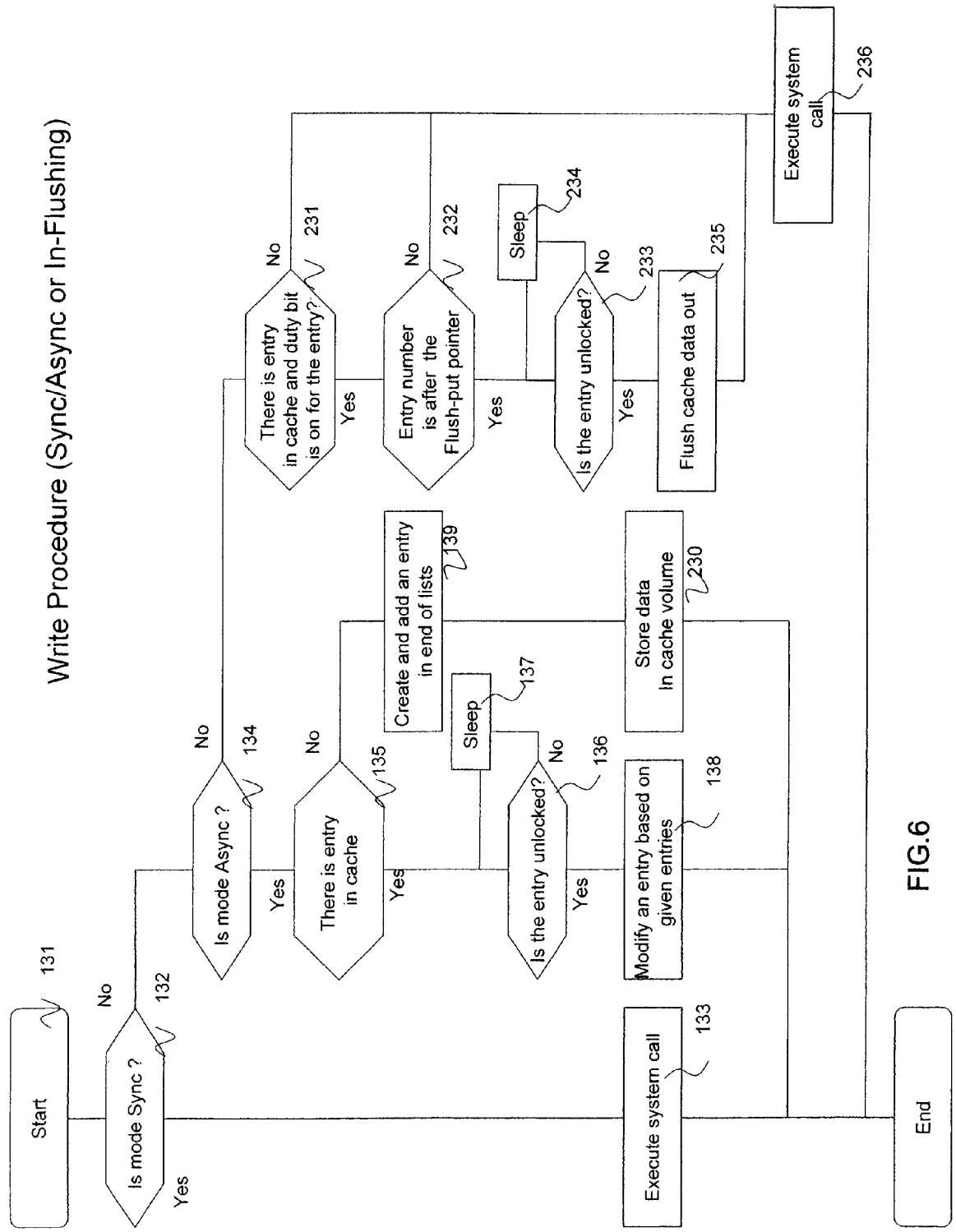
FIG. 6 is a flowchart of the steps performed to execute write related operations like "create", "write", "setattr" in the primary volume of the storage subsystem of the WAFS server.

The details of the operations to implement write related operations such as "create", "write", "setattr" are described below and are illustrated in FIG. 6.

According to the present invention as illustrated in FIG. 6, the NFS server 21 of the WAFS client 20 starts its write related operations upon receipt of commands requesting operations such as "create", "write", and "setattr" from the NFS client 12 on server 10 (Step 131). The write related operations are for the primary volume. The cache manager 23 checks the indicated access mode 26 in the WAFS client 20, namely whether the access mode is synchronous or not (Step 132). If access mode is synchronous, then the procedure goes to Step 133. If the access mode is not synchronous, then the procedure goes to Step 134. In Step 133 the cache manager 23 executes the requested operation on the mounted file system. Thereafter, the procedure ends.

With respect to executing the requested operation on the mounted file system, it should be noted that particular types of operations are to be performed. For example, when a "create" operation is the requested operation, the WAFS client 20 creates a file corresponding to the file handle on the file system using file open function call with create option. When a "write" operation is the requested operation, the WAFS client 20 writes data for a specified file corresponding to the file handle to the storage subsystem 40. When a "setattr" operation is the requested operation, the WAFS client 20 sets an attribute for the file corresponding to the file handle using the setattr function for the file system call.

Figure 14:
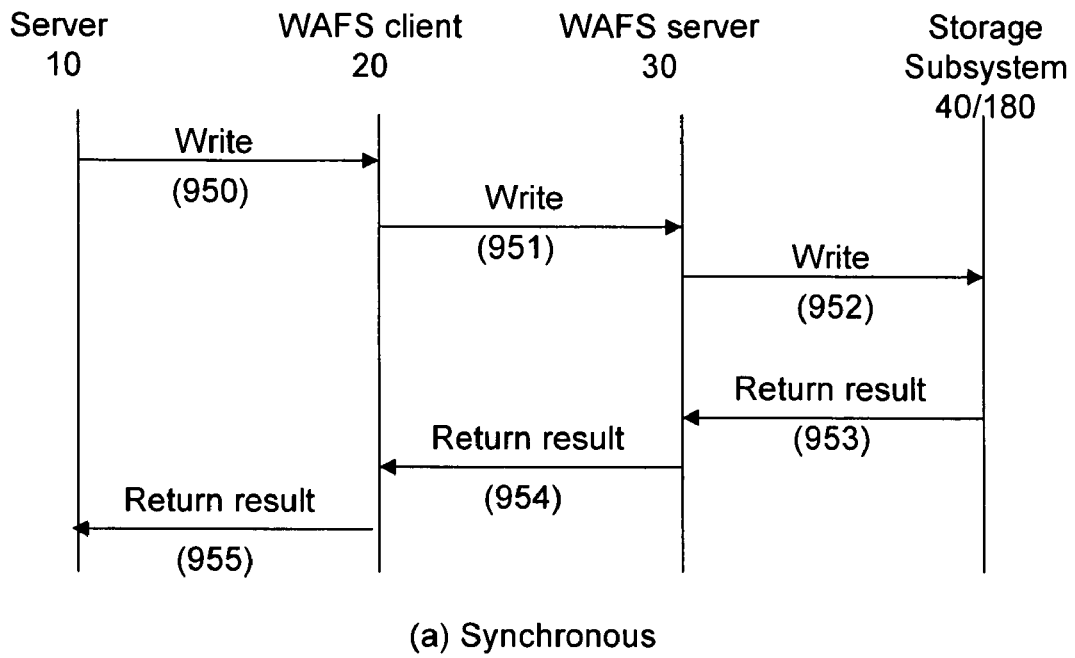
FIGS. 14(a) and 14(b) are flow diagrams of the sequence of steps performed to implement accesses in the synchronous and asynchronous modes.
Figure 14:
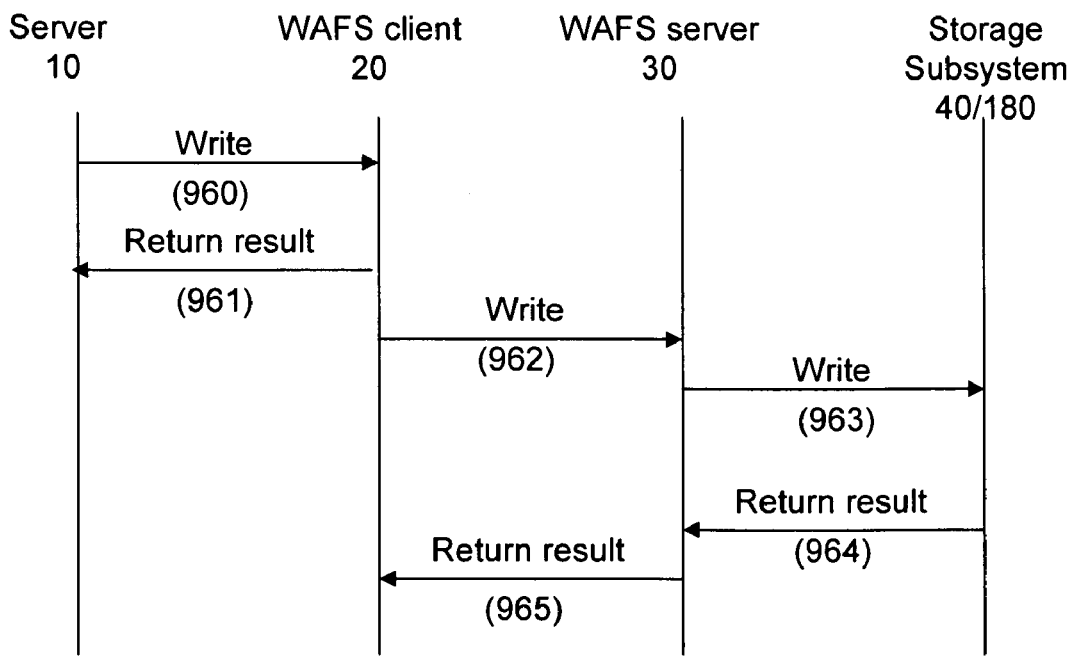

The sequence of steps performed to execute a "write" operation when the access mode is synchronous from the WAFS client 20 to the storage subsystem 40 is illustrated in FIG. 14(*a*) and will be discussed in detail below.

Continuing on with the procedure as illustrated in FIG. 6, the cache manager 23 further checks the indicated access mode 26 in the WAFS client 20 to determine whether the access mode is asynchronous or not (Step 134). If the access mode is asynchronous, then the procedure goes to Step 135. If the access mode is not asynchronous, then the procedure goes to Step 231.

If the access mode is asynchronous, then the cache manager 23 checks if there exists an entry in the cache table 24 specified by a file handle 121 (Step 135). If there is such an entry, then the procedure goes to Step 136. If there is not such an entry, then the procedure goes to Step 139.

If there is such an entry in the cache table 24, then the entry is checked as to whether it is unlocked or not (Step 136). If the entry is not unlocked (locked), then the procedure goes to Step 137. If the entry is unlocked, then the procedure goes to Step 138.

If the entry is locked, then the procedure sleeps for a period of time, for example, several ms as a delay before performing Step 136 again (Step 137).

If the entry is unlocked, then in Step 138 the cache manager 23 permits the items of the entry to be modified and a dirty bit 171 for the entry is marked to be "on". For example, each of a write operation and a write related operation in NFS client 10 has items including a file handle, offset, count, and data. These items are inserted in the cache table 24 in FIG. 5 in Step 138, thereby modifying the entry. The procedure then ends.

If there is not an entry in the cache table 24 specified by a file handle 121 with its dirty bit 171 set to be "on" as per Step 135, then the cache manager 23 creates an entry for the cache table 24 based on the parameters of the write operation or the write related operation from NFS server 21 as per the next FIFO pointer and marks the entry as dirty data by the dirty item 171 on the cache entry table 24 (Step 139). Then the cache manager 23 moves the FIFO pointer to next entry. Thereafter, the cache manager 23 stores data, provided by the write operation, in the cache volume 25 (Step 230). In order to store the data in cache volume 25, the WAFS client 20 creates a file which is named using a file handle in cache directory on WAFS client 20 which is predefined by the system and stores data in the named file. The procedure then ends.

The sequence of steps performed when the access mode is asynchronous, particularly Steps 134 to 138 or Step 230, is between a Sequence 960 and a Sequence 961 as illustrated in FIG. 14(*b*) and to be described in detail below.

If the access mode is not asynchronous as per Step 134, then the cache manager 23 checks if there exists an entry specified with a file handle where the dirty bit 171 is set to be "on" (Step 231). If there is such an entry, then the procedure goes to Step 232. If there is no such entry, then the procedure goes to Step 236.

If there is an entry specified with a file handle where the dirty bit 171 is set to be "on" as per Step 231, then the cache manager 23 checks whether the number of the entry is after a flush-out pointer (Step 232). The flush-out pointer indicates which entries have already been flushed out. If the number of the entry is after a flush-out pointer, then the procedure goes to Step 233. If the number of the entry is not after a flush-out pointer, then the procedure goes to Step 236.

If the number of the entry is after a flush-out pointer as per Step 232, then a check is made to determine whether the entry is unlocked or not. If the entry is locked, then the procedure goes to Step 234. If the entry is unlocked, then the procedure goes to Step 235.

If the entry after a flush-out pointer as per Step 232 is locked, then the procedure sleeps for a period of time, for example, several ms as a delay before performing Step 233 again (Step 234).

If the entry after a flush-out pointer as per Step 232 is unlocked, then the cache manager 23 obtains a lock for the entry, flushes cached data corresponding to the entry out to the mounted file system, turns the dirty bit 171 to be "off" and releases the lock 172.

If there is not an entry specified with a file handle where the dirty bit 171 is set to be "on" as per Step 231, or if the number of the entry is not after a flush-out pointer as per Step 232, or the cache data has been flushed out as per Step 235, then the cache manager 23 executes the requested operation on the mounted file system (Step 236). Thereafter, the procedure ends.

As a reference, the following Table 2 includes a plurality of entries with each entry including items the WAFS server can obtain based on a NFS operation.

TABLE 2

| Operation | Items (R is from return on an operation, I is from inputs on an operation) |
|---|---|
| create | File handle (R), Directory name (I), File name (I), attributes (I) |
| Setattr | File handle (R), Attributes (Mode, Permission, UID, GUID, etc . . .) (R) |
| Write | File handle (R), Attributes (R), data (I), offset for data (I), count for count (I) |
| . . . | . . . |

5. Flush Out Cached Data

According to the 1$^{st}$ practical example the flush operation is to write dirty cached data, which is marked by dirty bit 171, to the synchronous mounted file system which is provided by the WAFS server 30. The flush operation starts to flush cached data out from the first entry which is first-in of the entries in the cache table 24. To determine for which entry the cache manager has finished the flushing out of cached data, the cache manager 23 uses the above noted flush-out pointer. The flush-out pointer is used to distinguish whether cached data for an entry has been flushed out or not. When the cache manager 23 receives a request to flush data out to WAFS server 30, the cache manager 23 flushes all of the data from the cache volume 25. The details of the steps performed by the cache manager 23 to flush out cached data from the cache volume 25 are illustrated in FIG. 7.

Figure 7:
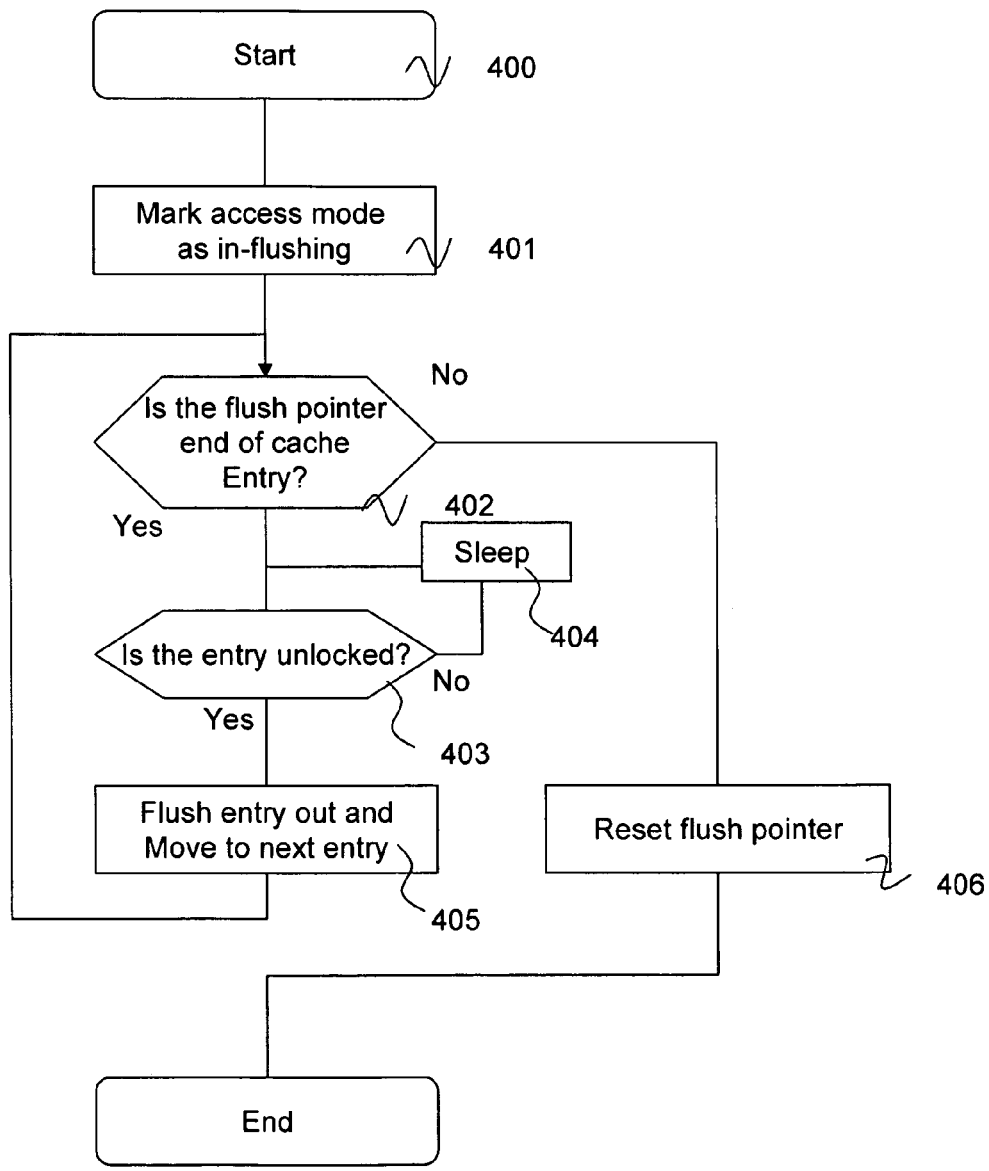
FIG. 7 is a flowchart of the steps performed by the cache manager after receiving a request to flush out data to the WAFS server, wherein the cache manager flushes out all dirty data from the cache.

As per FIG. 7 the cache manager 23 starts the procedure to flush out cached data from the cache volume 25, for example, upon performing Step 135 of the procedure illustrated in FIG. 6 (Step 400). The cache manager 23 marks access mode for the cached volume such as "in-flushing" (Step 401). The cache manager 23 sets the flush pointer to the first entry of the cache table, thereby starting the flushing from first entry of the cache table 24. The cache manager 23 then checks if the flush pointer has reached the end of the entries of the cache table 24 (Step 402). If the end of the entries of the cache table 24 has not been reached, then the procedure goes to Step 403. If the end of the entries of the cache table 24 has been reached, then the procedure goes to Step 406.

If the end of the entries of the cache table 24 has not been reached as per Step 402, then the cache manager 23 checks if the entry is unlocked (Step 403). If the entry is locked, then the procedure goes to Step 404. If the entry is unlocked, then the procedure goes to Step 405.

If the entry is locked as per Step 403, then the procedure sleeps for a period of time, for example, several ms as a delay before performing Step 403 again (Step 404).

If the entry is unlocked as per Step 403, then the cache manager 23 obtains a lock for the entry and flushes the cached data from the cache volume 25, namely items 122, 123, 124, 125, 126, 127 in the cache table 24 except for an item having the symbol "-" representing no data having been entered, and increments the flush pointer so as to move to the next entry in the cache table 24 (Step 405).

After flushing out cached data from the cache volume 25, the cache manager 23 releases the lock. During the time the lock is in place and when the NFS server 21 receives a write related operation, the NFS server 21 pauses to process the operation until release of the lock. Then cache manager 23 sets the current entry number on the flush-out pointer and moves to next entry on the cache table.

If the end of the entries of the cache table 24 has been reached as per Step 402, then the cache manager 23 resets the flush pointer to zero (0) (Step 406). Thereafter, the procedure ends.

With respect to the timing of a flush out operation, there are three policies as to when this operation is executed. The first policy is to periodically flush out cached data based on a user defined term such as to flush out cached data at predefined intervals, for example 1 minute, 10 minutes, or the like. The second policy is to flush out cached data upon occurrence of detection of a high watermark for dirty data in the cache volume. For example, if 70% of the data is dirty data as per the cache table 24, the flush operation is executed. The third policy is where the WAFS server 30 initiates the cached data flush out operation as will be discussed below.

6. Synchronous and Asynchronous Access from Server 10

Based on the behavior of the WAFS client 30, described below are examples of the sequence of operations required to perform synchronous and asynchronous access modes from server 10 to storage system 40. FIGS. 14(*a*) and 14(*b*) illustrate these examples.

In case of the synchronous access mode as illustrated in FIG. 14(*a*) the following is provided.

To begin with the server 10 sends a NFS write command to the WAFS client 20 (Sequence 950). The WAFS client 20 sends a SCSI write command to WAFS server 30 (Sequence 951). Then the WAFS server 30 sends a SCSI write command to storage subsystem 40 (Sequence 952). The storage subsystem 40 returns the result to WAFS server 30 (Sequence 953). The WAFS server 30 returns the result to WAFS client 20 (Sequence 954). The WAFS client 20 returns the result to server 10 (Sequence 955).

In case of the asynchronous access mode as illustrated in FIG. 14(*b*) the following is provided.

To begin with the server 10 sends a NFS write command to the WAFS client 20 (Sequence 960). The WAFS client 20 has cache data in their cache table 24 and cache volume 25. The WAFS client 20 returns the result to Server 10 (Sequence 961). After the flush out operation, the cached data is flushed out to the storage subsystem 40 using following sequence. The WAFS client 20 sends a SCSI write command to the WAFS server 30 (Sequence 962). The WAFS server 30 sends a SCSI write command to the storage subsystem 40 (Sequence 963). The storage subsystem 40 returns the result to the WAFS server 30 (Sequence 964). The WAFS server 20 returns the result to WAFS client 20 (Sequence 965).

Figure 8:
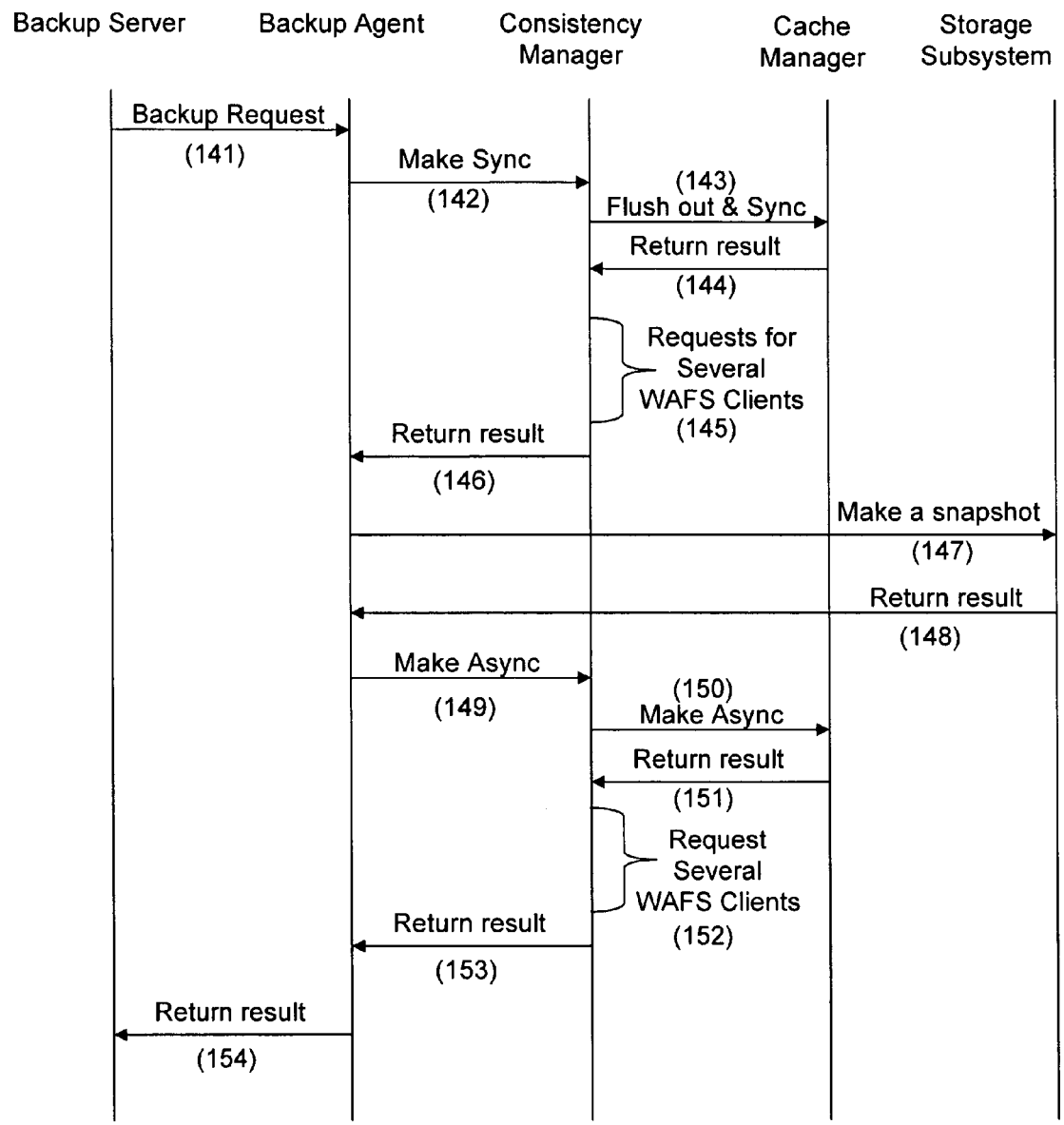
FIG. 8 is a flow diagram of the sequence of steps performed to bring to a state of consistency data on the WAFS clients as initiated from the WAFS server.

7. Make a Consistent State for a Set of Volumes for WAFS Client Initiated FROM WAFS Server In order to make a backup, the WAFS client 20 should flush out the cached data to storage subsystem 40. Further, in order to make a state of consistency on the WAFS client 20 as initiated from the WAFS server 30, the system uses the sequence of operations as illustrated in FIG. 8.

To begin with the backup server requests a backup agent to make a backup for a consistency group 46 as per FIG. 2 of logical configuration (Sequence 141). The consistency group includes several sets of pairs 44, 45 each having a primary volume and a secondary volume to keep consistency among pairs. Each pair of a consistency group is established between a primary volume and a secondary volume and has an initial copy formed by mirroring or similar technology as implemented by the storage subsystem 40.

The backup agent 34 requests the consistency manager 32 in the WAFS server 30 to make consistency between the data of several WAFS clients 20 (Sequence 142). The consistency manager 32, in the WAFS server 30, requests the cache manager 23 to flush out the cached data and change access mode from asynchronous to synchronous (Sequence 143). After the flush out operation, the cache manager 23 can inform the application 11 to flush out data by invoking Command Line Interface on the application 11 or Microsoft®'s VSS agent. The cache manager 23 flushes out data using a procedure including Steps 401-405 as illustrated in FIG. 7. The cache manager returns the result (Sequence 144).

If several WAFS clients 20 are included in the WAFS system, then the Sequences 143 to 144 are executed for each WAFS client (Sequence 145). The consistency manager 32 uses a table 160 as illustrated in FIG. 9 to manage status of an access mode for each client in the WAFS server 30.

The table 160 as per FIG. 9 includes a plurality of entries each having an IP address 161 of the WAFS client 20, an access mode 162 for the client, a result of the attempt to become asynchronous 163 such as "Success" or "In-process", and a result of the attempt to become synchronous. An indication of "Success" in element 163 represents success in moving to the indicated mode, "Failure" in element 163 represents a failure in moving to the indicated mode, and "-" in element 163 represents a situation where no process is performed.

When the WAFS client 20 changes its access mode, the WAFS server changes status of access mode based on WAFS client information. If the status for all of clients becomes synchronous, the procedure continues to the next sequence. After the consistency manager 32 waits for the cache manager 23 in WAFS client 20, the consistency manager 32 returns a result (Sequence 146).

The backup agent 34 requests that the storage system 40 conducts a sync & split for a consistency group using technology such as QuickShadow, ShadowImage or TrueCopy in order to make a point-in-time copy. Using a PIT technology, the backup agent 34 requests the storage subsystem 40 to make a snapshot (Sequence 147). The storage subsystem 40 returns the result to the backup agent 34 (Sequence 148). The backup agent 34 then requests the consistency manager 32 to be in the asynchronous access mode which is a cache mode in WAFS client 20 (Sequence 149). The consistency manager 32 requests the cache manager 23 to be in the asynchronous access mode (Sequence 150). The cache manager 23 changes the access mode from synchronous to asynchronous and marks an indication of the asynchronous access mode for the server in the table 160 and returns a result (Sequence 151). If there are several WAFS clients as per the table 160, then the Sequences 150 to 151 are processed until the end of entries for the WAFS clients 20 has been reached (Sequence 152). The consistency manager 32 returns a result of the process (Sequence 153). Then the backup agent 34 returns a result of the process (Sequence 154).

If there is failure in the access mode becoming asynchronous or synchronous as indicated by elements 163 and 164 of Table 160, then the backup agent 34 reports to the administrator via e-mail, error log, pager, Rich Site Summary (RSS), Simple Network Management Protocol (SNMP), etc. Thereafter the sequence of operations ends.

Regarding Sequences 145 and 152, the Sequences from 143 to 144 and the Sequences from 148 and 150 for each WAFS client 20 can be processed in parallel. Regarding Sequences 143 and 150, the consistency manager can have a timer which measures, for example 30 minute intervals or 60 minute intervals to wait for a response from a WAFS client 20 to confirm the available of a machine with polling status of WSFS server 30. Thus, the consistency manager avoids an indefinite wait for the machine. If the timer times out, the consistency manager 32 marks it as a failure of the operation in element 163 in case of asynchronous mode and element 164 in case of synchronous mode on the table 160 illustrated in FIG. 9.

8. Restore Operation

Figure 17:
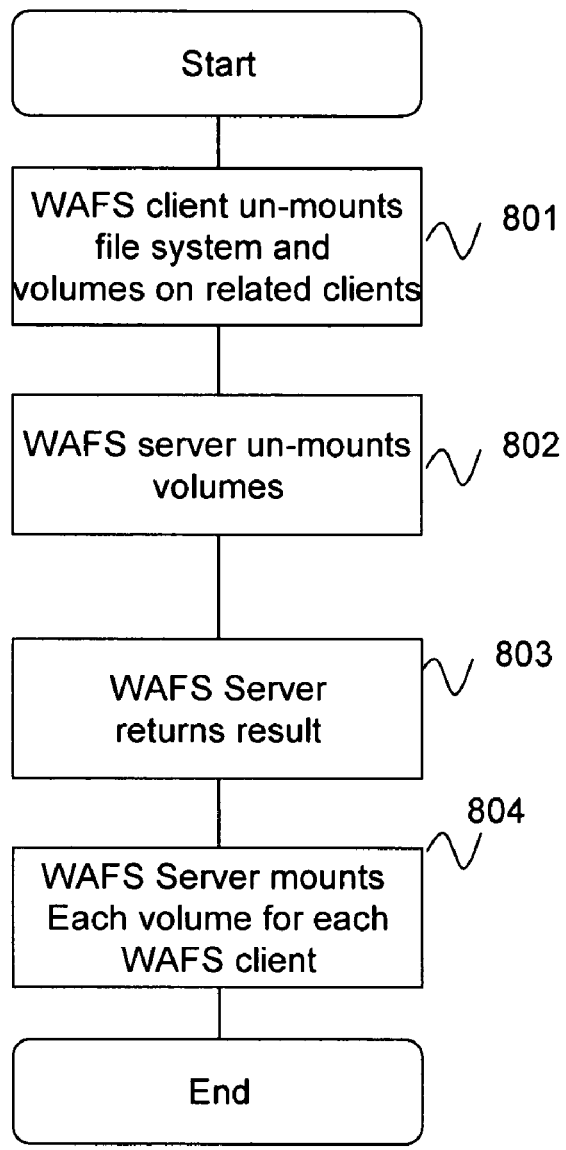
FIG. 17 illustrates the steps of the procedures to process a restore operation according to an embodiment of the present invention.

The backup server 39 should already know which logical unit is for backup and the logical unit number for the logical unit to be backed up. To process a restore operation, the following procedure as illustrated in FIG. 17 is used after a request from the backup server 39 indicating primary and secondary logical unit numbers.

As per this procedure the WAFS client 20 un-mounts file system and volumes on related WAFS clients 20 automatically or manually (Step 801). The WAFS server 30 un-mounts the volume and pulls data back from the secondary volume to the primary volume to make a pair between the secondary volume and primary volume. The copy direction is set from the secondary volume to the primary volume and resync and split commands are issued for the pair in case of QuickShadow, ShadowImage or TrueCopy or the restore command is issued to restore data from snapshots from the primary volume (Step 802). The volume is then mounted and the secondary volume is re-exported to the WAFS client 20. The WAFS server 30 returns the result (Step 803). The WAFS server 30 mounts each volume for each WAFS client 20 automatically or manually (Step 804).

$2^{nd}$ PRACTICAL EXAMPLE

The following is a description of the $2^{nd}$ practical example when a Network Attached Storage (NAS) 180 is used in combination with the WAFS system.

1. Physical Configuration

A basic configuration of the $2^{nd}$ practical example as illustrated in FIG. 10 is the same as that of the $1^{st}$ practical example illustrated in FIG. 1, with the exception that a NAS 180 is used instead of storage subsystem 40. Further the WAFS server 30 uses a Network Interface Card (NIC) 37 instead of HBA 3006 as per FIG. 1.

The NAS 180 has NAS controllers 1801-1 through 1801-$n$ and disks 1802-1 and 1802-$m$. Each NAS controller 1801 has a CPU 180101, memory 180102, and a Port 180103 to connect the disks 1802, NVRAM to protect cache memory. As an example of a NAS that can be used is the Data ONTAP® 6.4 product by Network Appliances, Inc.

2. Logical Configuration

The logical configuration of the $2^{nd}$ practical example as illustrated in FIG. 11 is the same as that illustrated in FIG. 2, with the exception that the NAS 180 is inserted instead of the storage subsystem 40. Thus, the WAFS server 30 is configured to include a NFS client 184 in FIG. 11 instead of Device Driver 33 in FIG. 2. Also, the WAFS server 30 uses file protocol to access the NAS 180 exported directories, for example, using NFS protocol and is configured to include a status table to confirm the status of access mode for the client side. There are several export methods that can be used other than NFS such as NFS/CIFS and special protocols which are based on NFS but tries to read ahead of the NFS access pattern based on application behavior. The WAFS server 30 re-exports the directories on NAS 180 to the WAFS client 20 using NFS protocol. WAFS clients 20 can mount WAFS server 30 exported NFS directories under POSIX API on NFS protocol. Therefore the cache manager can operate WAFS client 22 through POSIX API. The WAFS server 30 makes use of user level NFS server 181 to export directories. The WAFS server 30 can also use the Common Internet File System (CIFS) protocol or some other kind of file sharing protocol like WebDAV, or the like.

The NAS 180 can create directories of its file system and can export the directories to the NFS client 184 in the WAFS server 30. The NAS 180 also has a capability to make a point-in-time snapshot of the file or directories therein. To make consistent group snapshots, data directories such as wafs1, wafs2, wafs3, etc. residing on a file system 182 are used. The snapshot functionality provided, for example, by Data ONTAP can be used to take the snapshots as described by Data ONTAP 6.4 Commands: Manual Page Reference Part Number 210-00337 from Page 276 to 282

3. Initial Setup

Before explaining the details of the procedures for implementing the $2^{nd}$ practical example, a description of the initial setup procedure is provided.

Figure 16:
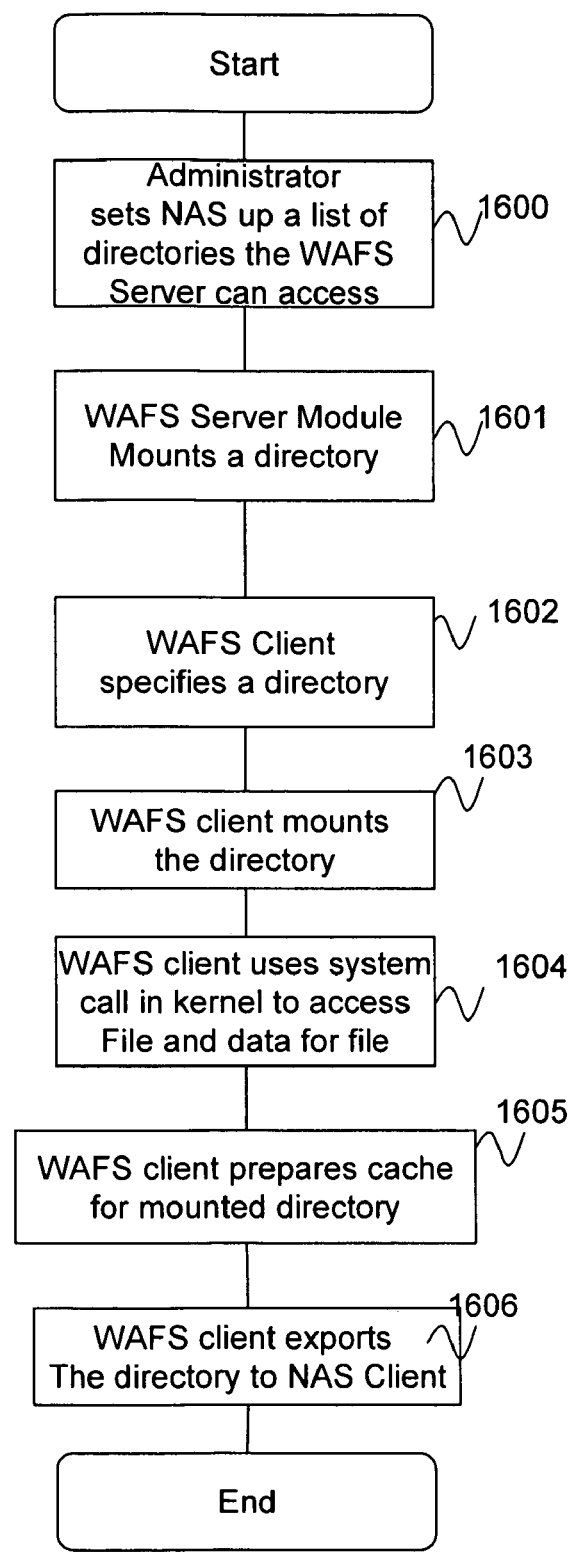
FIG. 16 illustrates the steps of the initial setup of the $2^{nd}$ practical example of the WAFS system according to an embodiment of the present invention.

FIG. 16 illustrates the steps of the initial setup procedure for the $2^{nd}$ practical example. As per FIG. 16 the Administrator sets NAS 180 up with a list 930 of directories to which the WAFS server 30 is allowed access (Step 1600).

Figure 13:
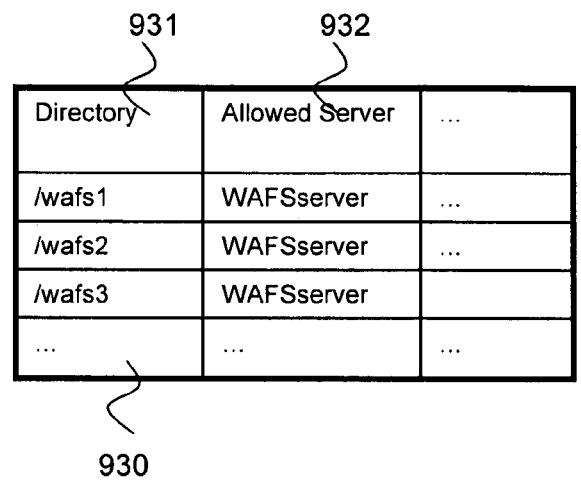
FIG. 13 illustrates an example of a directory list table 930 in NAS according to an embodiment of the present invention.

As per FIG. 13, the list 930 includes a plurality of entries each having a name of a directory 931 and the WAFS server 30 allowed to access the directory 932. Thus, the list permits the export of the directory 931 and allows an indicated WAFS server 932 to access the directory 931. The WAFS server 30 mounts a directory on NAS which is exported by the NAS 180 in the NFS client 184 specifying IP and directory on the directory of the WAFS server 30. The WAFS server 30 also re-exports the mounted directory to WAFS client 22.

Further, the WAFS server module 31 has a list 530 as per FIG. 12 of entries of directories in the WAFS server 30 exported to the WAFS client module 22 in WAFS client 20. The list 530 as illustrated in FIG. 12 includes a plurality of entries with each entry including a directory name 531 for the exported directories, an Internet Protocol (IP) address 532 of the host which is allowed to have access to the directory, and a port number 533 to which the host is connected to access the directory. If an authentication feature between the WAFS client module 22 and the WAFS server module 31 is needed, then the list 530 can be expanded to include an identification (ID) and password for each entry.

As per FIG. 16, the WAFS client module 22 in each WAFS client 20 specifies a directory on WAFS server using an IP address and port number to mount a WAFS server exported directory on the WAFS client 20 (Step 1601). If authentication to access the directory is required, then an ID and password is supplied for matching with the entries on the list 930 (Step 1602). The directory is mounted in WAFS client 20. The WAFS client module 22 mounts the directory provided by NFS as synchronous access (Step 1603). The WAFS client 20 makes use of the system call in their kernel to access file and the data for the file (Step 1604). The WAFS client 20 prepares its cache for the mounted directory (Step 1605). The WAFS client 20 exports the directory to NFS client 12 based on administrator requested export targets (Step 1606).

4. Access from WAFS Client to Server Considering Cache

The operations performed in the $2^{nd}$ practical example of the WAFS system, particularly the WAFS client 20 when a cache is included are the same as that described above with respect to the $1^{st}$ practical example of the WAFS system. Therefore, the details of these operations for the $2^{nd}$ practical example of the WAFS system are not discussed.

5. Flush Cached Data Out

The operations performed in the $2^{nd}$ practical example of the WAFS system to implement the flush operation are the same as that described above with respect to the $1^{st}$ practical example. Therefore, the details of these operations for the $2^{nd}$ practical example of the WAFS system are not discussed.

6. Synchronous and Asynchronous Access from Server 10

Based on the behavior of the WAFS client 30, described below are examples of the sequence of operations required to perform synchronous and asynchronous access modes from Server 10 to NAS 180. FIGS. 14($a$) and 14($b$) illustrate these examples.

In the case of the synchronous access mode as illustrated in FIG. 14($a$), the following is provided.

To begin with the server 10 sends a NFS write command to WAFS client 20 (Sequence 950). The WAFS client 20 sends a NFS write command to WAFS server 30 (Sequence 951). Then the WAFS server 30 sends a NFS write command to NAS 180 (Sequence 952). The NAS 180 returns the result to WAFS server 30 (Sequence 953). The WAFS server 30 returns the result to WAFS client 20 (Sequence 954). The WAFS client 20 returns the result to Server 10 (Sequence 955).

In the case of the asynchronous access mode as illustrated in FIG. 14$b$, the following is provided.

To begin with the server 10 sends a NFS write command to the WAFS client 20 (Sequence 960). The WAFS client 20 has cache data in its cache table 24 and cache volume 25. The WAFS client 20 returns the results to Server 10 (Sequence 961). After the flush out operation, the cached data is flushed out to the NAS 180 using following sequence. The WAFS client 20 sends a NFS write command to the WAFS server 30 (Sequence 962). The WAFS server 30 sends a NFS write command to the NAS 180 (Sequence 963). The NAS 180 returns the result to the WAFS server 30 (Sequence 964). The WAFS server 20 returns the results to WAFS client 20 (Sequence 965).

7. Make a Consistent State for a Set of Exported Directories for WAFS Client Initiated from WAFS Server The procedures to implement the operations to make a consistent state for a set of volumes for the WAFS Client 20 initiated from the WAFS server 30 for the $2^{nd}$ practical example is the same as the $1^{st}$ practical example, with the exception of the use and operation of a snapshot. Further, since a file system on the NAS 180 is used, the operation uses one command which is "snapshot" for files and directories on a file system instead of pair creation, sync, and split. Based on these changes, the following provides a description of two of the sequences which are different from the above.

Referring to FIG. 8, the two differences of sequences are Sequences 141 and 147. With respect to Sequence 14, the backup server 39 requests backup agent 34 to make a backup for a volume which is referenced by the file system of the NAS 180. The file system exports directories, wherein each directory on the file system is exported to a WAFS client 20 via a WAFS server 30. With respect to Sequence 147, the backup agent 34 requests the NAS 180 to create a snapshot for the volume of the file system.

8. Restore Operation

According to the present invention the procedure to implement the restore operation for the $2^{nd}$ practical example is the same as that described above with respect to the $1^{st}$ practical example, with the exception that the steps to perform the restore command changes, particularly with respect to Step 803. In the $1^{st}$ practical example volume level mirror technology is used. However, in the $2^{nd}$ practical example file system level restore is used.

In Step 803 according to the $2^{nd}$ practical example the WAFS server 30 un-mounts the volume, pulls back data from a snapshot to a target directory, such as snapshot on same directory to target directory /wafs1 and re-exports the secondary volume to WAFS client 20.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. An information processing system comprising:
a plurality of servers each executing an application;
a plurality of Wide Area File System (WAFS) clients which are correspondingly connected to said servers;
a WAFS server which is connected to said each WAFS client;
a storage system, connected to said WAFS server, which stores data for use by the application being executed by said server, said data being stored in a plurality of volumes forming a consistency group; and
a backup server, connected to said WAFS server, for controlling backup of the consistency group of said storage system, wherein each WAFS client comprises:
a cache for temporarily storing data of files accessed on said storage system, and
a cache manager for managing the operation of the cache,
wherein said WAFS server comprises:
a backup agent that responds to a backup request from said backup server, and
a consistency manager that maintains consistency among the caches of the WAFS clients and the consistency group,
wherein when said backup server connected to the WAFS server requests said backup agent, included in the WAFS server, to make a backup of a consistency group, said backup agent in the WAFS server requests that said consistency manager in said WAFS server bring to a state of consistency of the data among the caches of said WAFS clients and that the mode of access of the WAFS server by the WAFS client be changed from asynchronous mode to synchronous mode,
wherein said consistency manager in WAFS server, in response to said backup agent, requests said cache manager in each WAFS client to flush all dirty data out of said cache and to change mode of access by said WAFS client from the asynchronous mode to a synchronous mode,
wherein said cache manager in WAFS client, in response to said consistency manager, flushes all dirty data out of the cache to the WAFS server, and after flushing all dirty data out of the cache, changes the mode of access of the WAFS server by the WAFS client from the asynchronous mode to the synchronous mode,
wherein said storage system, in response to a request from said backup agent, makes a snapshot for the consistency group, and
wherein said consistency manager in said WAFS server, in response to a request from the backup agent, requests the cache manager in said WAFS client to change the mode of access from the synchronous mode to the asynchronous mode to enable the cache in said WAFS client to operate.

2. The information processing system according to claim 1, wherein the application sends several system commands to a Network File System (NFS) client included in said server,
wherein said NFS client translates each system command to a protocol used by a NFS server included in said WAFS client,
wherein said NFS client performs at least two basic operations,
wherein a first operation of said at least two basic operations performed by said NFS client implements read related operations, and
wherein a second operation of said at least two basic operations performed by said NFS client implements write related operations.

3. The information processing system according to claim 2, wherein said read related operations includes lookup, read, and get attribute (getattr) operations, and
wherein said write related operations includes create, write, and set attribute (setattr) operations.

4. The information processing system according to claim 1, wherein said cache includes a plurality of entries each entry being temporarily stored data of files accessed on said storage system, and
wherein the entries in said cache are managed by said cache manager using a First-In-First-Out (FIFO) algorithm.

5. The information processing system according to claim 4, wherein said cache manager responds differently to said first operation as compared to said second operation.

6. The information processing system according to claim 3, wherein said cache includes a plurality of entries each entry being temporarily stored data of files accessed on said storage system, and
wherein the entries in said cache are managed by said cache manager using a First-In-First-Out (FIFO) algorithm.

7. The information processing system according to claim 4, wherein In order to manage said cache using the FIFO algorithm, the cache manager has a pointer to indicate an end of the latest entry of a cache table corresponding to the earliest data stored in the cache, and
wherein said pointer is incremented by one after each entry, and if the pointer reaches the end of the cache table, then the pointer is reset to indicate the first entry of the cache table.

8. The information processing system according to claim 6, wherein In order to manage said cache using the FIFO algorithm, the cache manager has a pointer to indicate an end of the latest entry of a cache table corresponding to the earliest data stored in the cache, and
wherein said pointer is incremented by one after each entry, and if the pointer reaches the end of the cache table, then the pointer is reset to indicate the first entry of the cache table.

9. The information processing system according to claim 7, wherein said cache manager maintains a value to indicate a current access mode of said cache including whether the access mode of said cache is synchronous, asynchronous, or in-flushing.

10. The information processing system according to claim 8, wherein said cache manager maintains a value to indicate a current access mode of said cache including whether the access mode of said cache is synchronous, asynchronous, or in-flushing.

11. The information processing system according to claim 9, wherein if the access mode is synchronous, then said cache manager executes an operation corresponding to the issued command on a mounted file system which is provided to the WAFS server module synchronously.

12. The information processing system according to claim 10, wherein if the access mode is synchronous, then said cache manager executes an operation corresponding to the issued command on a mounted file system which is provided to the WAFS server module synchronously.

13. The information processing system according to claim 7, wherein said cache table includes a plurality of entries each having an entry number which is a fixed value for each entry to uniquely identify the entry, a file handle which identifies the file in the file system, information regarding the cached data including a file name, an User Identification (UID), a Group Identification (GID), attributes, a directory on the mounted file system, a cache data location, an offset and a count for the file, a cache dirty bit indicating by being "on" or "off" whether the corresponding data is dirty or not, and a lock for the entry for preventing changes to the entry when the lock is set to be "on" and not preventing such changes when the lock is set to "off".

14. The information processing system according to claim 8, wherein said cache table includes a plurality of entries each having an entry number which is a fixed value for each entry to uniquely identify the entry, a file handle which identifies the file in the file system, information regarding the cached data including a file name, an User Identification (UID), a Group Identification (GID), attributes, a directory on the mounted file system, a cache data location, an offset and a count for the file, a cache dirty bit indicating by being "on" or "off" whether the corresponding data is dirty or not, and a lock for the entry for preventing changes to the entry when the lock is set to be "on" and not preventing such changes when the lock is set to "off".

15. The information processing system according to claim 13, wherein if said lock is set to be "on", said file handle, filename and directory can not be operated on.

16. The information processing system according to claim 14, wherein if said lock is set to be "on", said file handle, filename and directory can not be operated on.

17. The information processing system according to claim 15, wherein if the access mode is other than synchronous, then the cache manager checks existence of an entry specified by file handle,
  wherein if such an entry does exists, then it is checked whether the entry is locked.

18. The information processing system according to claim 16, wherein if the access mode is other than synchronous, then the cache manager checks existence of an entry specified by file handle,
  wherein if such an entry does exists, then it is checked whether the entry is locked.

19. A method of making a state of consistency of a plurality of caches of a plurality of Wide Area File System (WAFS) clients as initiated from a WAFS server which is connected to a storage system which stores data for use by an application being executed by a server, said data being stored in a plurality of volumes forming a consistency group, said method comprising the steps of:
  requesting a backup agent, included in said WAFS server, to make a backup for said consistency group,
  wherein said consistency group includes several sets of pairs each having a primary volume and a secondary volume to keep consistency among pairs;
  requesting, by said backup agent, a consistency manager, included in said WAFS server, to make consistency between data stored in the caches of said WAFS clients;
  requesting, by said consistency manager a cache manager, included in each WAFS client, to flush dirty data out of the cache of said WAFS client and to change an access mode of the cache from an asynchronous mode to a synchronous mode;
  flushing, by said cache manager, in response to said consistency manager, all dirty data out of the cache, and after flushing all dirty data out of the cache, changing the access mode of the cache from the asynchronous mode to the synchronous mode;
  making, in response to a request from said backup agent, a snapshot for the consistency group; and
  requesting, in response to a request from the backup agent, the cache manager to change the access mode of the cache from the synchronous mode to the asynchronous mode to enable the cache to operate.

20. The method according to claim 19, wherein the application sends several system commands to a Network File System (NFS) client included in said server,
  wherein said NFS client translates each system command to a protocol used by a NFS server included in said WAFS client,
  wherein said NFS client performs at least two basic operations,
  wherein a first operation of said at least two basic operations performed by said NFS client implements read related operations, and
  wherein a second operation of said at least two basic operations performed by said NFS client implements write related operations.

21. The method according to claim 20, wherein said read related operations includes lookup, read, and get attribute (getattr) operations, and
  wherein said write related operations includes create, write, and set attribute (setattr) operations.

22. The method according to claim 19, wherein said cache includes a plurality of entries each entry being temporarily stored data of files accessed on said storage system, and
  wherein the entries in said cache are managed by said cache manager using a First-In-First-Out (FIFO) algorithm.

23. The method according to claim 22, wherein said cache manager responds differently to said first operation as compared to said second operation.

24. The method according to claim 21, wherein said cache includes a plurality of entries each entry being temporarily stored data of files accessed on said storage system, and
  wherein the entries in said cache are managed by said cache manager using a First-In-First-Out (FIFO) algorithm.

25. The method according to claim 22, wherein In order to manage said cache using the FIFO algorithm, the cache manager has a pointer to indicate an end of the latest entry of a cache table corresponding to the earliest data stored in the cache, and
  wherein said pointer is incremented by one after each entry, and if the pointer reaches the end of the cache table, then the pointer is reset to indicate the first entry of the cache table.

26. The method according to claim 24, wherein In order to manage said cache using the FIFO algorithm, the cache manager has a pointer to indicate an end of the latest entry of a cache table corresponding to the earliest data stored in the cache, and
  wherein said pointer is incremented by one after each entry, and if the pointer reaches the end of the cache table, then the pointer is reset to indicate the first entry of the cache table.

27. The method according to claim 25, wherein said cache manager maintains a value to indicate a current access mode of said cache including whether the access mode of said cache is synchronous, asynchronous, or in-flushing.

28. The method according to claim 26, wherein said cache manager maintains a value to indicate a current access mode of said cache including whether the access mode of said cache is synchronous, asynchronous, or in-flushing.

29. The method according to claim 27, wherein if the access mode is synchronous, then said cache manager executes an operation corresponding to the issued command on a mounted file system which is provided to the WAFS server module synchronously.

30. The method according to claim 28, wherein if the access mode is synchronous, then said cache manager executes an operation corresponding to the issued command on a mounted file system which is provided to the WAFS server module synchronously.

31. The method according to claim 25, wherein said cache table includes a plurality of entries each having an entry number which is a fixed value for each entry to uniquely identify the entry, a file handle which identifies the file in the mounted file system, information regarding the cached data including a file name, an User Identification (UID), a Group Identification (GID), attributes, a directory on the mounted file system, a cache data location, an offset and a count for the file, a cache dirty bit indicating by being "on" or "off" whether the corresponding data is dirty or not, and a lock for the entry for preventing changes to the entry when the lock is set to be "on" and not preventing such changes when the lock is set to "off".

32. The method according to claim 26, wherein said cache table includes a plurality of entries each having an entry number which is a fixed value for each entry to uniquely identify the entry, a file handle which identifies the file in the file system, information regarding the cached data including a file name, an User Identification (UID), a Group Identification (GID), attributes, a directory on the mounted file system, a cache data location, an offset and a count for the file, a cache dirty bit indicating by being "on" or "off" whether the corresponding data is dirty or not, and a lock for the entry for preventing changes to the entry when the lock is set to be "on" and not preventing such changes when the lock is set to "off".

33. The method according to claim 31, wherein if said lock is set to be "on", said file handle, filename and directory can not be operated on.

34. The method according to claim 32, wherein if said lock is set to be "on", said file handle, filename and directory can not be operated on.

35. The method according to claim 33, wherein if the access mode is other than synchronous, then the cache manager checks existence of an entry specified by file handle,
wherein if such an entry does exists, then it is checked whether the entry is locked.

36. The method according to claim 34, wherein if the access mode is other than synchronous, then the cache manager checks existence of an entry specified by file handle,
wherein if such an entry does exists, then it is checked whether the entry is locked.

* * * * *